United States Patent
Mori

(10) Patent No.: US 7,263,228 B2
(45) Date of Patent: Aug. 28, 2007

(54) APPARATUS AND METHOD FOR DETECTING A PATTERN

(75) Inventor: Toshihiro Mori, Neyagawa (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 10/976,002

(22) Filed: Oct. 29, 2004

(65) Prior Publication Data

US 2005/0089228 A1    Apr. 28, 2005

Related U.S. Application Data

(62) Division of application No. 09/841,039, filed on Apr. 25, 2001.

(30) Foreign Application Priority Data

| Apr. 26, 2000 | (JP) | ............................. 2000-125947 |
| Apr. 26, 2000 | (JP) | ............................. 2000-125948 |
| Apr. 26, 2000 | (JP) | ............................. 2000-125949 |

(51) Int. Cl.
| G06K 9/66 | (2006.01) |
| G06K 9/00 | (2006.01) |
| G06K 9/34 | (2006.01) |
| G06K 9/62 | (2006.01) |
| G06K 9/36 | (2006.01) |
| G06K 9/46 | (2006.01) |
| G06T 11/00 | (2006.01) |
| G09G 5/00 | (2006.01) |
| G06F 15/00 | (2006.01) |
| G06K 1/00 | (2006.01) |
| G06K 15/02 | (2006.01) |

(52) U.S. Cl. ...................... 382/195; 382/135; 382/137; 382/176; 382/209; 382/237; 345/636; 345/468; 345/469.1; 358/1.11; 358/462

(58) Field of Classification Search ................ 382/173, 382/190, 181–187, 194–195, 203, 209, 217–218, 382/237, 259, 299, 308, 135, 137–140, 176; 345/634, 636, 641, 467–469, 469.1, 470; 358/1.11, 426.04, 448, 455, 458, 462
See application file for complete search history.

(56) References Cited

U.S. PATENT DOCUMENTS

| 4,395,698 | A | * | 7/1983 | Sternberg et al. ............ 382/308 |
| 4,567,610 | A | * | 1/1986 | McConnell .................. 382/170 |
| 4,644,585 | A | * | 2/1987 | Crimmins et al. ........... 382/283 |
| 4,700,401 | A | * | 10/1987 | Masatsugu et al. ......... 382/218 |

(Continued)

FOREIGN PATENT DOCUMENTS

JP    11-053539    2/1999

*Primary Examiner*—Bhavesh M Mehta
*Assistant Examiner*—Manav Seth
(74) *Attorney, Agent, or Firm*—Buchanan Ingersoll & Rooney PC

(57) ABSTRACT

A method for detecting a specific pattern contained in an image. The pattern-detection method has steps of binarizing the input image data to obtain binary image data, recognizing a partial image that is contained in the binary image data, is part of the specific pattern, and has an empty inside, and determining the specific pattern contained in the image based on the recognition results. In the partial-image recognition step, a pixel-block area of predetermined size containing an target pixel is successively scanned for the binary image data, and a partial image contained in the binary image data is recognized on the condition that at least one OFF-pixel exists within a reference block consisting of the target pixel and predetermined pixels in its neighborhood within the block.

14 Claims, 19 Drawing Sheets

U.S. PATENT DOCUMENTS

| | | | |
|---|---|---|---|
| 4,724,543 A * | 2/1988 | Klevecz et al. | 382/133 |
| 4,821,333 A * | 4/1989 | Gillies | 382/308 |
| 5,048,109 A * | 9/1991 | Bloomberg et al. | 382/164 |
| 5,148,495 A * | 9/1992 | Imao et al. | 382/176 |
| 5,168,147 A * | 12/1992 | Bloomberg | 235/456 |
| 5,181,255 A * | 1/1993 | Bloomberg | 382/176 |
| 5,201,011 A * | 4/1993 | Bloomberg et al. | 382/175 |
| 5,202,933 A * | 4/1993 | Bloomberg | 382/176 |
| 5,224,179 A * | 6/1993 | Denker et al. | 382/259 |
| 5,390,003 A * | 2/1995 | Yamaguchi et al. | 382/216 |
| 5,684,891 A * | 11/1997 | Tanaka et al. | 382/178 |
| 5,898,795 A | 4/1999 | Bessho | |
| 6,272,244 B1 | 8/2001 | Takahashi et al. | |
| 6,347,156 B1 | 2/2002 | Kamada et al. | |
| 6,636,635 B2 * | 10/2003 | Matsugu | 382/218 |

* cited by examiner

EXAMPLES OF OK

NUMBER OF
ON-PIXELS : 10
SIZE : 3×4

NUMBER OF
ON-PIXELS : 9
SIZE : 4×3

NUMBER OF
ON-PIXELS : 6
SIZE : 3×3

NUMBER OF
ON-PIXELS : 10
SIZE : 4×4

EXAMPLES OF NG

NUMBER OF
ON-PIXELS : 12
SIZE : 4×4

NUMBER OF
ON-PIXELS : 10
SIZE : 5×4

NUMBER OF
ON-PIXELS : 5
SIZE : 3×3

NUMBER OF
ON-PIXELS : 8
SIZE : 4×4

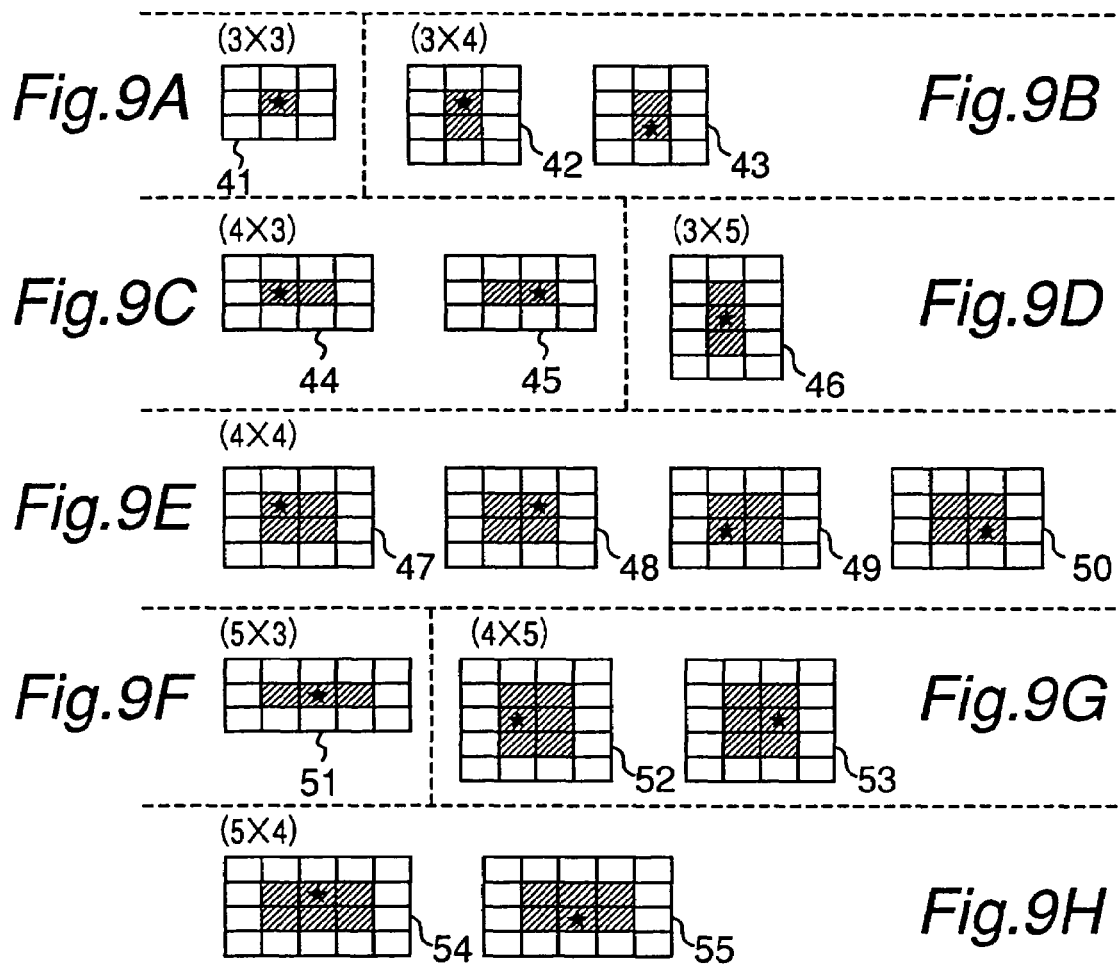

CONDITION $\begin{cases} A+A'<2 \\ B+B'<2 \end{cases}$

★ : ATTENTION PIXEL

CONDITION $\begin{cases} E1 \leqq 4 \\ E5 \leqq 4 \\ Ea \leqq 4 \\ Ee \leqq 4 \end{cases}$

★ : ATTENTION PIXEL

CONDITION $\begin{cases} E1+E5 \leqq 5 \\ Ea+Ee \leqq 5 \end{cases}$

★ : ATTENTION PIXEL

Fig.18
SCORE 100 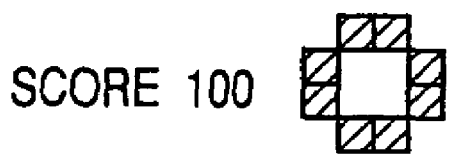
SCORE 90 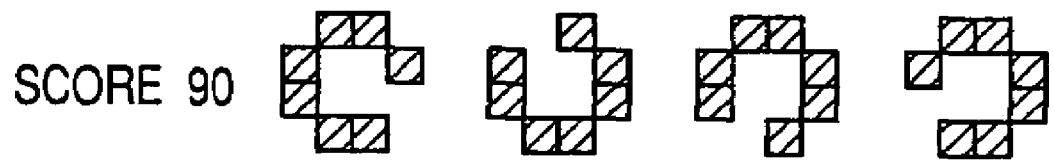
SCORE 80 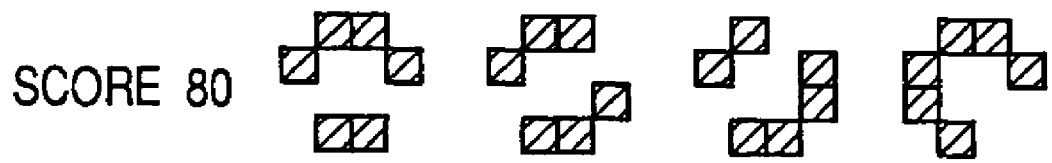
SCORE 70 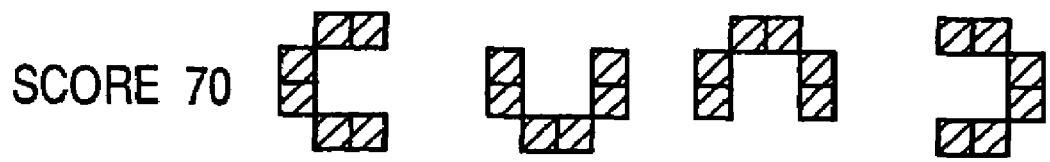

| TOTAL SCORE : 520 |
|---|
| SCORE 100×1 |
| SCORE  90×3 |
| SCORE  80×1 |
| SCORE  70×2 |

APPARATUS AND METHOD FOR DETECTING A PATTERN

This application is a divisional of U.S. application Ser. No. 09/841,039, filed on Apr. 25, 2001, which claims priority under 35 U.S.C. § 119 to Application No. 2000-125947, No. 2000-125948 and No. 2000-125949 filed in Japan, the entire contents of which are hereby incorporated by reference.

BACKGROUND OF THE INVENTION

The present invention relates to an apparatus and method for detecting a specific pattern contained in an image.

A pattern matching processing has been known as one of data processing performed in an apparatus, such as copier, which stores obtained image data in an image memory as binary or multi-valued data and detects a specific pattern or recognizes a shape contained in an image by comparing the data with the pixel data of a reference pattern stored previously in a memory.

In recent years, as scanning input apparatus and printing output apparatus, those that can rapidly process a large amount of information such as high-resolution data have been widely used. With performing various data processings including pattern matching processing with these apparatus at real time, there is a problem that their hardware configurations become complex. In order to resolve this problem, a pattern-detection apparatus that can rapidly detect a specific pattern and has a simple configuration is desired.

As one of such pattern-detection apparatus, there is known an apparatus that recognizes a partial image having a predetermined shape and size and being part of a specific pattern, based on condition that (1) the number of ON-pixel within m×n pixel rectangle block area in the neighborhood of an target pixel falls within a predetermined range, and that (2) no ON-pixel exists within a predetermined area in the neighborhood of said block area, after low-resolution converting a binary data. However, this pattern-detection apparatus cannot precisely identify a partial image, in particular, having an empty inside and often wrongly detects another image, such as a circular image having an all over painted inside or a quadrilateral or triangular image composed of multiple pixels of the same size, with the desired partial image. Also, this pattern recognition apparatus cannot precisely identify the shape of a partial image and often wrongly detects for the desired image, another image such as an L-shaped image or diagonal line.

Further, as a pattern-detection apparatus that can rapidly detect a specific pattern and has a simple configuration, the following one is known. The specific pattern is the detection object for this apparatus and consists of a plurality of partial images having a predetermined shape and size. In this apparatus, binary image data is successively scanned by a filter in which the specific pattern is framed. A score is set for the arrangement of the partial images recognized in the area framed by the filter. The apparatus determines the detection of the specific pattern based on the score. However, in this apparatus, if at least one of the partial images constituting the specific pattern is not recognized, then even if the recognition results for other partial images are perfect, the specific pattern cannot be detected.

SUMMARY OF THE INVENTION

The object of the present invention is to provide a pattern-detection apparatus that can detect a specific pattern with high precision and has a simple configuration and also to provide a pattern detection method for detecting a specific pattern used by the apparatus.

To achieve the above object, in an aspect of the invention, there is provided a pattern-detection apparatus that detects a specific pattern contained in an image. The pattern-detection apparatus has a binarizing unit that binarizes an input image to obtain binary image data, a partial-image recognition unit that recognizes a partial image that is contained in the binary image data, and that is part of the specific pattern and has an empty inside, and a specific pattern determination unit that determines the specific pattern contained in the image, based on the recognition results obtained by the partial-image recognition unit. The partial-image recognition unit successively scans, for the binary image data, a pixel-block area of predetermined size containing an target pixel and recognizes a partial image contained in the binary image data, on the condition that at least one OFF-pixel exists within a reference block consisting of the target pixel and predetermined pixels in its neighborhood. Also, the partial-image recognition unit may change the size of the reference block, depending on the size of the partial-image to be recognized within the pixel-block area. Further, the above partial-image recognition unit may recognize the partial image on at least one of the conditions that the pixels constituting the outermost lines of a pixel-block area are all OFF-pixels, and that the number of ON-pixels contained in a predetermined area with its center being at an target pixel in said pixel-block area is within a prescribed range. Further, the pattern-detection apparatus may have a low-resolution conversion unit that converts the binary image data obtained by the binarizing unit to binary image data of lower resolution, and the partial-image recognition unit may recognize the partial image for the binary image data converted to lower-resolution image data by the low-resolution conversion unit.

Also, in another aspect of the present invention, there is provided a method for detecting a specific pattern contained in an image. The pattern-detection method has steps of binarizing input image data to obtain binary image data, recognizing a partial image that is contained in the binary image data, and that is part of the specific pattern, and has an empty inside, and determining the specific pattern contained in the image based on the recognition results. In the partial-image recognition step, a pixel-block area of predetermined size containing an target pixel is successively scanned for the binary image data, and a partial image contained in the binary image data is recognized on the condition that at least one OFF-pixel exists within a reference block consisting of an target pixel and predetermined pixels in its neighborhood.

Further, in another aspect of the present invention, there is provided a computer-readable storage medium that stores a pattern-detection program for detecting a specific pattern contained in an image. The pattern-detection program has steps of binarizing an input image to obtain binary image data, recognizing a partial image that is contained in the binary image data, and that is part of the specific pattern, and has an empty inside, and determining the specific pattern contained in the image based on the recognition results. In the partial-image recognition step, a pixel-block area of predetermined size containing an target pixel is successively scanned for the binary image data, and a partial image contained in the binary image data is recognized on the condition that at least one OFF-pixel exists within a reference block consisting of an target pixel and predetermined pixels in its neighborhood.

In another aspect of the invention, there is provided a pattern-detection apparatus that detects a specific pattern contained in an image. The pattern-detection apparatus has a binarizing unit that obtains binary image data by binarizing input image data, a partial-image recognition unit that recognizes a partial image that is contained in the binary image data and that is part of the specific pattern, a setting device that determines similarity between a reference image and the partial image recognized by the partial-image recognition unit and sets a value corresponding to the similarity, and a specific pattern determination unit that determines the specific pattern contained in the image, based on the value corresponding to the similarity and set by the setting device. The partial-image recognition unit may scan successively, for the binary image data, a pixel-block area of predetermined size containing an target pixel and recognizes a partial image within the block, based on a predetermined condition. The setting device may set values for a plurality of scanned pixel-block areas, corresponding to the similarity, and the specific pattern determination unit may determine the specific pattern contained in the image, based on the total value of the values set by the setting device and corresponding to the similarity. The partial-image recognition unit may further determine the partial image on at least one of the conditions that the pixels constituting the outermost lines of a pixel-block area are all OFF-pixels, and the number of ON-pixels contained in a predetermined area with its center at an target pixel in the pixel-block area falls within a prescribed range. Further, the pattern-detection apparatus may have a low-resolution conversion unit that converts the binary image data obtained by the binarizing unit to binary image data of lower resolution, and the partial-image recognition unit may recognize a partial image for the binary image data converted to lower-resolution image data by the low-resolution conversion unit.

Also, in another aspect of the present invention, there is provided a method for detecting a specific pattern contained in an image. The pattern-detection method has steps of binarizing input image data to obtain binary image data, recognizing a partial image that is contained in the binary image data, and that is part of the specific pattern, and determining similarity between the recognized partial image and a reference image, setting a value corresponding to the similarity, and determining the specific pattern contained in the image, based on the set values corresponding to the similarity.

Further, in another aspect of the present invention, there is provided a computer-readable storage medium that stores a pattern-detection program for detecting a specific pattern contained in an image. The pattern-detection program has steps of binarizing input image data to obtain binary image data, recognizing a partial image that is contained in the binary image data, and that is part of the specific pattern, and determining similarity between the recognized partial image and a reference image, setting a value corresponding to the similarity, and determining the specific pattern contained in the image, based on the set values corresponding to the similarity.

In another aspect of the invention, there is provided a pattern-detection apparatus that detects a specific pattern contained in an image. The pattern-detection apparatus has a binarizing unit that binarizes an input image data to obtain binary image data, a partial-image recognition unit that recognizes a partial image that is contained in the binary image data and that is part of the specific pattern, and a specific pattern determination unit that determines the specific pattern contained in the image based on the recognition results obtained by the partial-image recognition unit. The partial-image recognition unit recognizes a partial image contained in the binary image data, for a pixel-block area having predetermined size and containing an target pixel in the binary image data, based on at least one of the conditions concerning the pixels at the opposite vertices, the pixels on the outermost lines of the pixel-block area, and the pixels on the opposite sides on the outermost lines of the pixel block. The partial image may be approximately a circular image. Also, the condition for the partial-image recognition in the partial-image recognition unit may be that the number of OFF-pixels in each pixel pair that is located at opposite vertices is less than 2. Further, the condition for the partial-image recognition in the partial-image recognition unit may be that the total number of ON-pixels on the outermost lines is not more than a predetermined number, for the pixels on the outermost lines of the pixel-block area. Still further, the condition for the partial-image recognition in the partial-image recognition unit may be that the total number of ON-pixels on the outermost lines is not more than a predetermined number, for the pixels on each pair of opposite sides on the outermost lines of the pixel-block area. Further, the pattern-detection apparatus may have a low-resolution conversion unit that converts the binary image data obtained by the binarizing unit to binary image data of lower resolution, and the partial-image recognition unit may recognize the partial image for the binary image data converted to lower-resolution image data by the low-resolution conversion unit.

Also, in another aspect of the present invention, there is provided a method for detecting a specific pattern contained in an image. The pattern-detection method has steps of binarizing input image data to obtain binary image data, recognizing a partial image that is contained in the binary image data, and that is part of the specific pattern, and has an empty inside, and determining the specific pattern contained in the image based on the recognition results. In the partial-image recognition step, the partial image contained in the binary image data is recognized, for a pixel-block area having predetermined size and containing an target pixel in the binary image data, based on at least one of the conditions concerning the pixels at the opposite vertices, the pixels on the outermost lines of the pixel-block area, and the pixels on each pair of opposite sides on the outermost lines of the pixel-block area.

Further, in another aspect of the present invention, there is provided a computer-readable storage medium that stores a pattern-detection program for detecting a specific pattern contained in an image. The pattern-detection program has steps of binarizing input image data to obtain binary image data, recognizing a partial image that is contained in the binary image data, and that is part of the specific pattern, and determining the specific pattern contained in the image based on the recognition results. In the partial-image recognition step, the partial image contained in the binary image data is recognized, for a pixel-block area having predetermined size and containing an target pixel in the binary image data, based on at least one of the conditions concerning the pixels at the opposite vertices, the pixels on the outermost lines of the pixel-block area, and the pixels on each pair of opposite sides on the outermost lines of the pixel-block area.

BRIEF DESCRIPTION OF THE DRAWINGS

Other objects and attainments together with a fuller understanding of the invention will become apparent and appreciated by referring to the following description and claims taken in conjunction with the accompanying drawings, in which like parts are designated by like reference numerals and in which:

FIGS. 9A, 9B, 9C, 9D, 9E, 9F, 9G and 9H show examples of reference blocks set in the pixel-block areas containing element candidates of various sizes;

FIG. 18 shows examples of how to set scores for various elements in accordance with the third embodiment of the present invention;

DESCRIPTION OF THE PREFERRED EMBODIMENTS

In the following are described some embodiments of the present invention with reference to the attached figures.

First Embodiment

Figure 1:
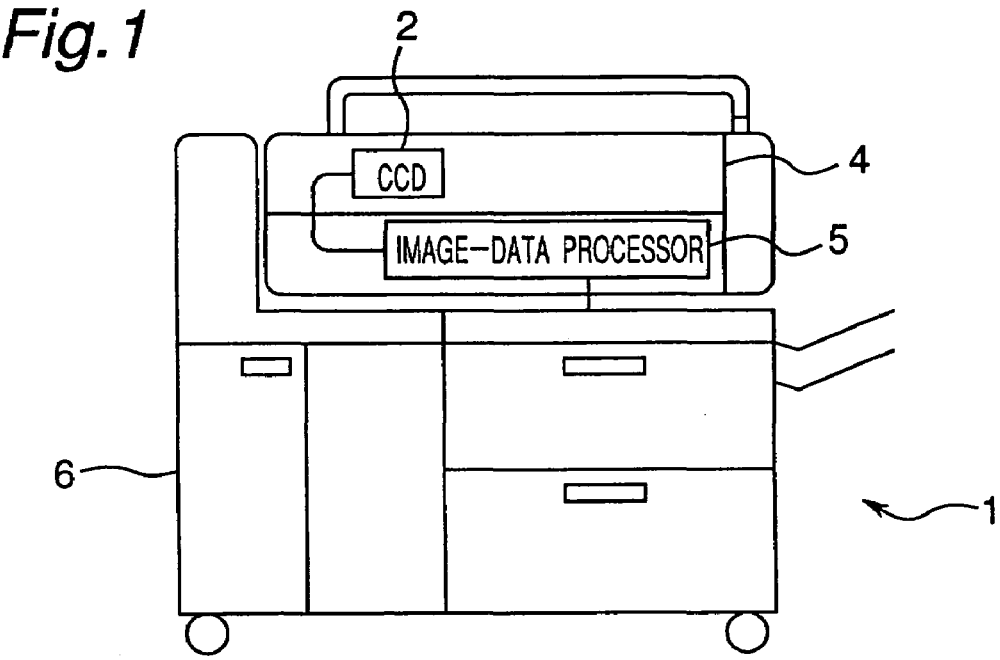
FIG. 1 schematically shows a copier in accordance with a first embodiment of the present invention.
Figure 2:
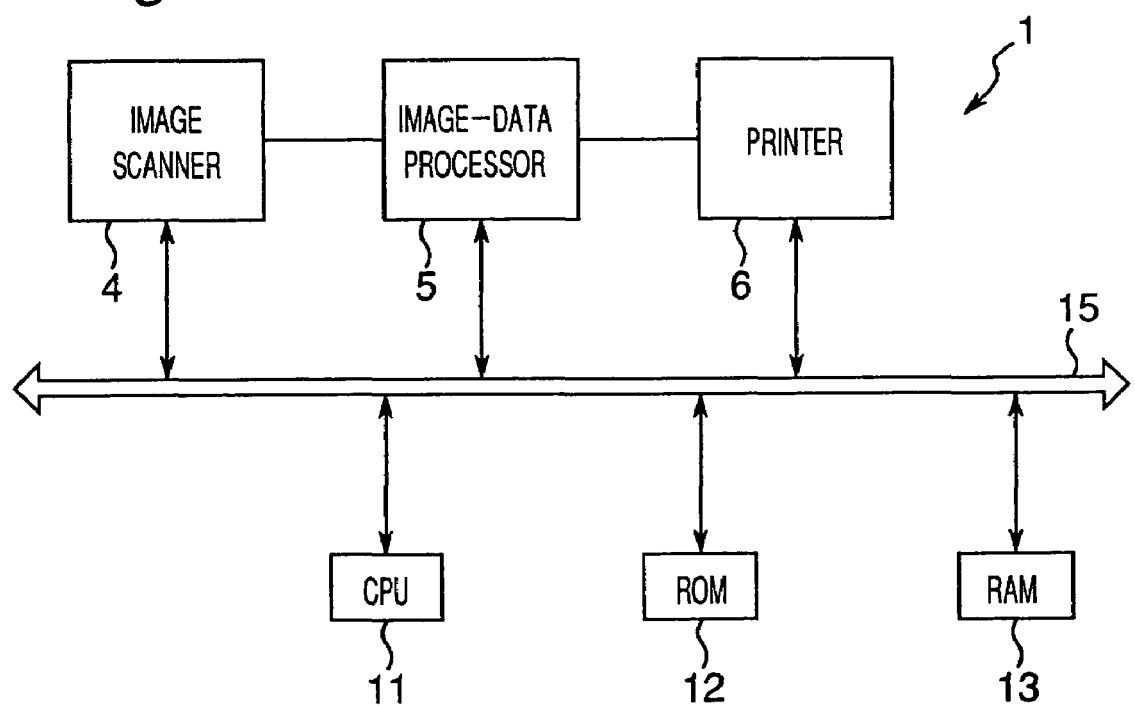
FIG. 2 is a block diagram that illustrates the basic configuration of the copier in accordance with the first embodiment of the present invention.

FIG. 1 schematically illustrates a copier in accordance with a first embodiment of the present invention, and FIG. 2 is a block diagram that shows a basic configuration of the copier. This copier 1 comprises, as its basic components, an image scanner 4 that reads a manuscript using an optical system to obtain image data, an image-data processor 5 that performs various processing including character-recognizing processing for the image data, a printer 6 that performs printing based on the image data. As seen from FIG. 2, these components are connected, through a data bus 15, to a CPU 11 that controls the various components built into the copier 1, a ROM 12 that stores control programs for the CPU 11, and a RAM 13 that temporarily stores data and programs executed by the CPU 11 for control.

In this copier 1, first, a CCD 2 of the image scanner 4 optically reads a manuscript on a manuscript table and performs photoelectric transfer. A tri-line linear CCD with 3 lines of sensor elements corresponding to three color components, R (red), G (green), and B (blue) is used for the CCD 2. This linear CCD can obtain three colors of light, R, G, and B from the reflected light with one-time scanning, when light is irradiated on a manuscript of the manuscript table. The linear CCD can convert each of the three colors of light into an electric signal (analog image data). The analog image data obtained by the image scanner 4 is input to the image-data processor 5 to be processed thereby and converted to an output format appropriate for the printer 6. The printer 6 creates a hard copy based on the image data output from the image-data processor 5. The operation of each component during this process is executed by CPU 11, which stores the programs recorded in ROM 12 in RAM 13 and successively reads them.

Figure 3:
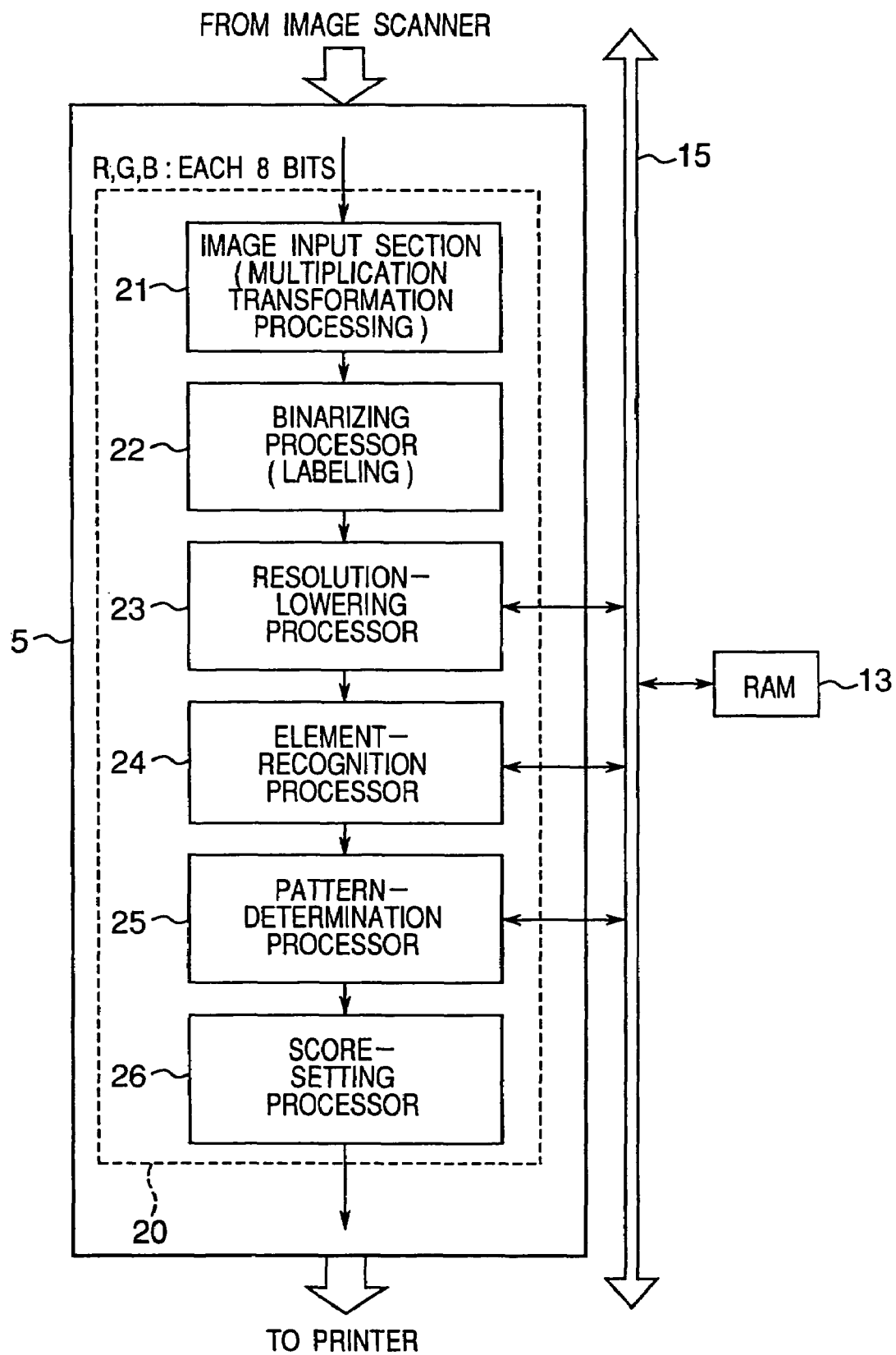
FIG. 3 is a block diagram that illustrates the configuration of a pattern-detection processor in the image-data processor of FIG. 2.

A pattern-detection processor that detects a pattern having a predetermined shape and size and printed on the manuscript is built into the image-data processor 5. FIG. 3 is a block diagram illustrating the configuration of the pattern-detection processor built into the image-data processor 5. This pattern-detection processor 20 has an image-input section 21 to which digitized image data is input, a low-resolution converting processor 23 that lowers the resolution of the image data, and binarizing processor 22 that performs labeling (binarizing) each density value of the pixels constituting the image data whose resolution has been lowered.

The image data input to the image-input section 21 is data in which each of R (red), G (green), and B (blue) has density value of 8 bits (256 levels). In this image-input section 21, preprocessing of resolution conversion, multiplication transformation and the like may be added, if necessary. The binarizing processor 22 determines whether a density value for a given color of each of the pixels constituting the image data is within a predetermined reference range and performs binarizing processing to set the pixel having the density value within the reference range as an ON-pixel. It is noted that an "ON-pixel" is a pixel having the value 1 in binary image data and represents a pixel in which a point exists. This definition is applied hereafter. The image data is then input to the resolution-lowering processor 23 to be converted to low-resolution data, by pixel-skipping to be processed later for element-recognition processing. The low-resolution image data is temporarily stored in a predetermined memory such as RAM 13.

As seen from FIG. 3, the pattern-detection processor 20 has an element-recognition processor 24 that recognizes the elements that is contained in the image data, and that is part of a specific pattern, a pattern-determination processor 25 that determines a pattern composed of a plurality of elements, and a score-setting processor 26 that gives a score for the determination results.

The element-recognition processor 24 reads the image data stored in RAM 13 to recognize an element in the image data. This "element" represents a partial-image that constitutes part of a pattern and has an empty inside, a predetermined size and color. The results obtained by the element-recognition processing are stored again in RAM 13. The pattern-determination processor 25 determines, based on the arrangement of a plurality of elements stored in RAM 13, whether a specific pattern is composed of these elements. The score-setting processor 26 gives a score for the determination results by the pattern-determination processor 25.

Figure 4:
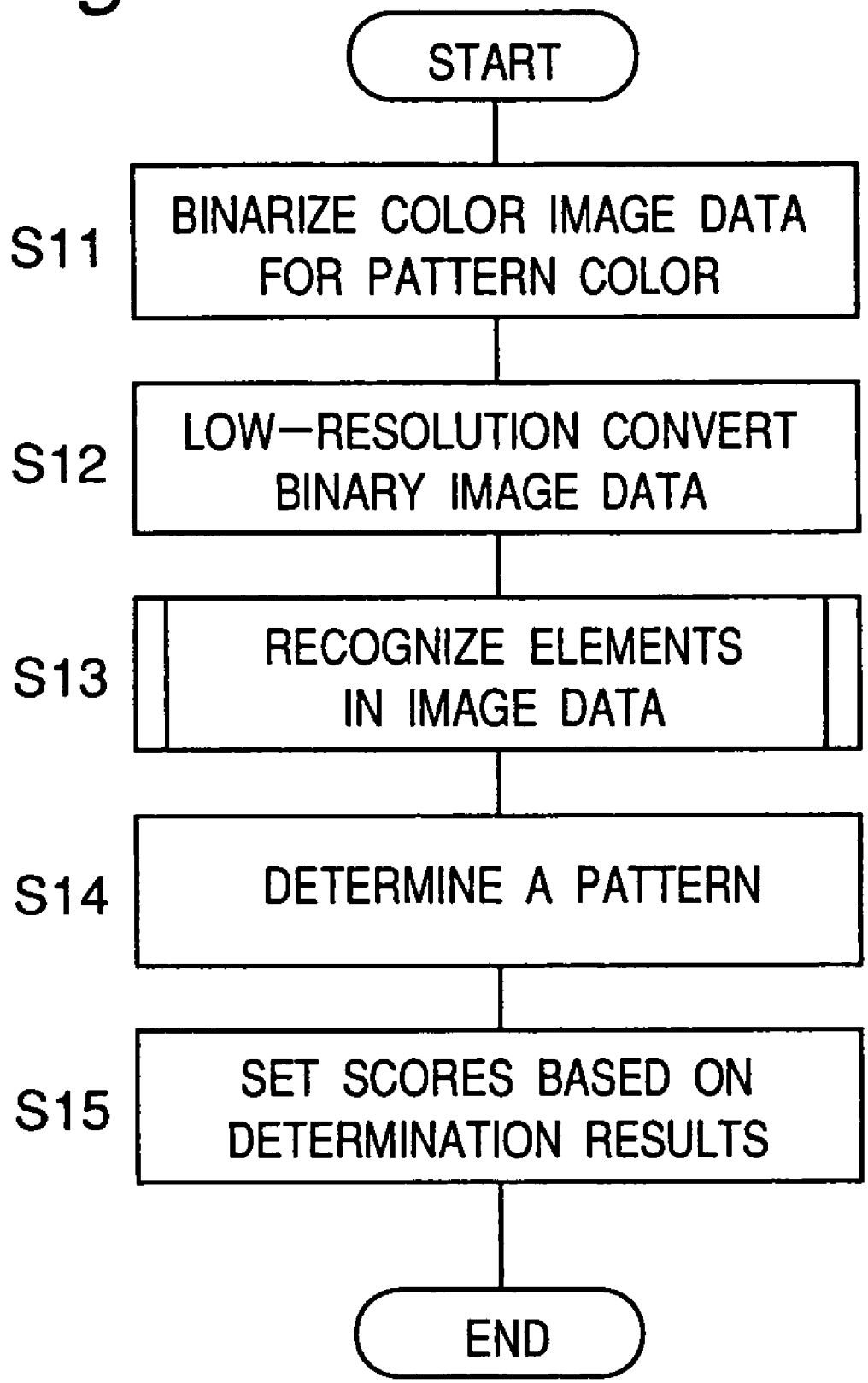
FIG. 4 is a flowchart of pattern-detection processing in accordance with the first embodiment of the present invention.

FIG. 4 is a flowchart of pattern-detection processing by the pattern-detection processor 20. In this pattern-detection processing, first, the color image data input through the image-input section 21 is binarized for the pattern color (S11). Next, the binary image data is converted to a low-resolution image data (S12) Then, the whole binary image data of low resolution is successively scanned by a filter of m×n size in which an element can be framed, and elements contained in the image data are recognized (S13). This element-recognition processing is detailed later with reference to FIG. 10. Then, the binary image data is scanned by a filter of a size in which a specific pattern can be framed, and the pattern is recognized based on the arrangement of the recognized elements (S14). Then, the obtained pattern-determination results are evaluated, and a score corresponding to the results are set (S15). The pattern-detection processing is thus finished.

Figure 5:
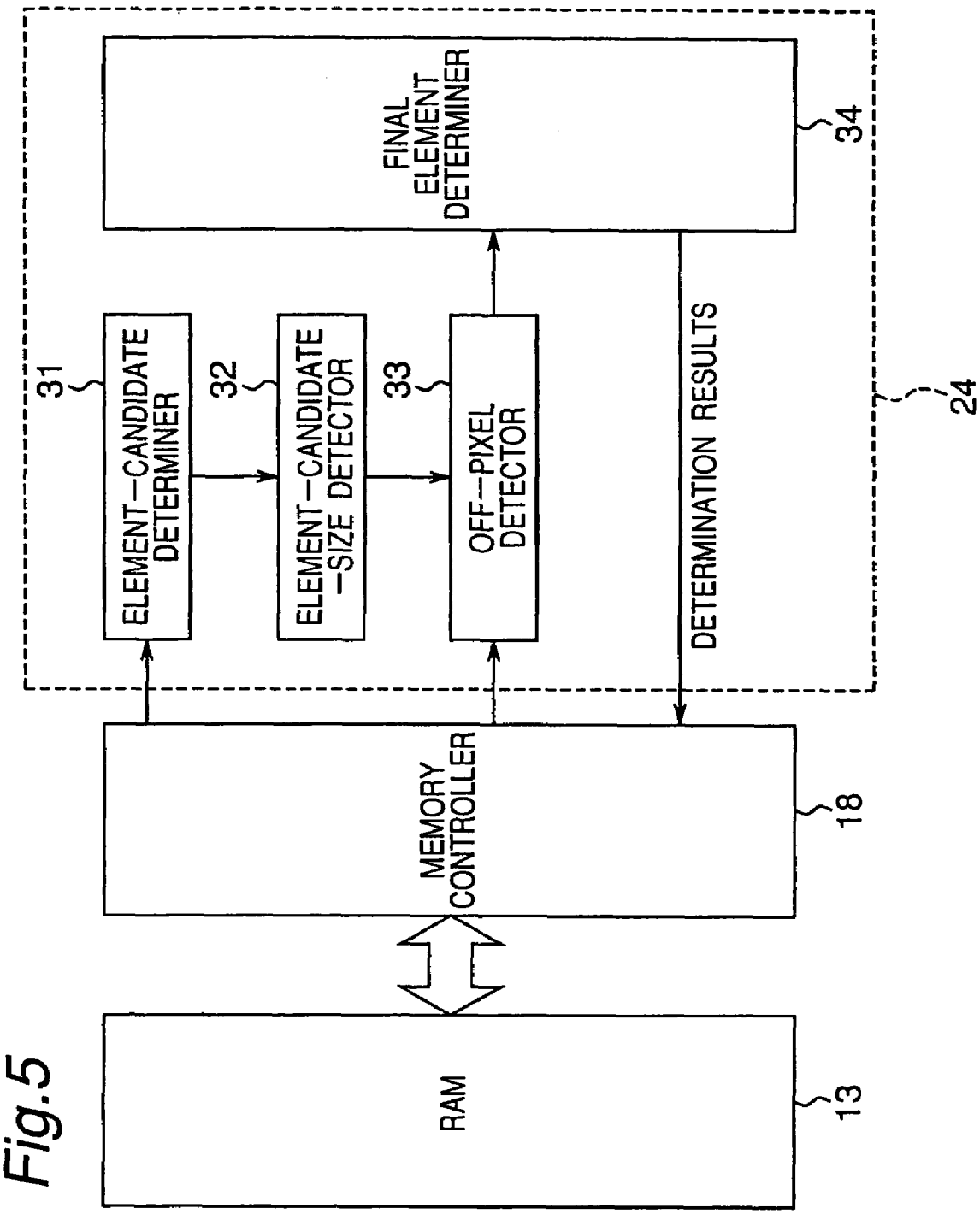
FIG. 5 is a block diagram that illustrates the configuration of an element-recognition processor in the pattern-detection processor in accordance with the first embodiment of the present invention.

FIG. 5 is a block diagram that represents the configuration of the element-recognition processor 24 in the pattern-detection processor 20. This element-recognition processor 24 has an element-candidate determiner 31 that evaluates recognition objects in the image data based on predetermined conditions to identify recognition objects satisfying the conditions as element candidates, an element-candidate-size detector 32 that detects the size of the recognition object identified as an element candidate, an OFF-pixel detector 33 that detects OFF-pixels that exist in a reference block within a pixel block area containing the recognition object, which consists of an target pixel and predetermined pixels in its neighborhood, and a final element determiner 34 that determines a final element depending on the determination and detection results by these components. In this first embodiment, the reading and writing of data performed by the element-recognition processor 24 for RAM 13 are controlled by a memory controller 18.

It is noted that an "target pixel" represents a reference pixel that is located at the center or its neighborhood of each pixel-block area, when pixel-block areas in the image data are successively scanned, during the element-recognition processing, by a filter of m×n size in which an element can be framed. An "OFF-pixel" is a pixel having value 0 in binary image data, that it is a pixel in which a point does not-exit. These definitions are also applied hereinafter.

The memory controller 18 derives, during the element-recognition processing, the address on RAM 13 where the binary image data is stored, and successively reads pixel-block areas in the binary image data from RAM 13. These pixel-block areas are rectangular block-areas consisting of m×n pixels with its center being at an target pixel. The size of a pixel-block area is determined based on processing resolution and the size of an ideal element. The pixel-block areas read by the memory controller 18 are input to the element-candidate determiner 31 and the OFF-pixel detector 33.

The element-candidate determiner 31 evaluates recognition objects in input pixel-block areas based on predetermined conditions to identify recognition objects satisfying the conditions as element candidates. The predetermined conditions are that (1) the pixels constituting the outermost lines of a pixel-block area are all OFF-pixels, and that (2) the number of ON-pixels contained in a predetermined area with its center being at an target pixel in the pixel-block area is within a prescribed range.

Figure 6:
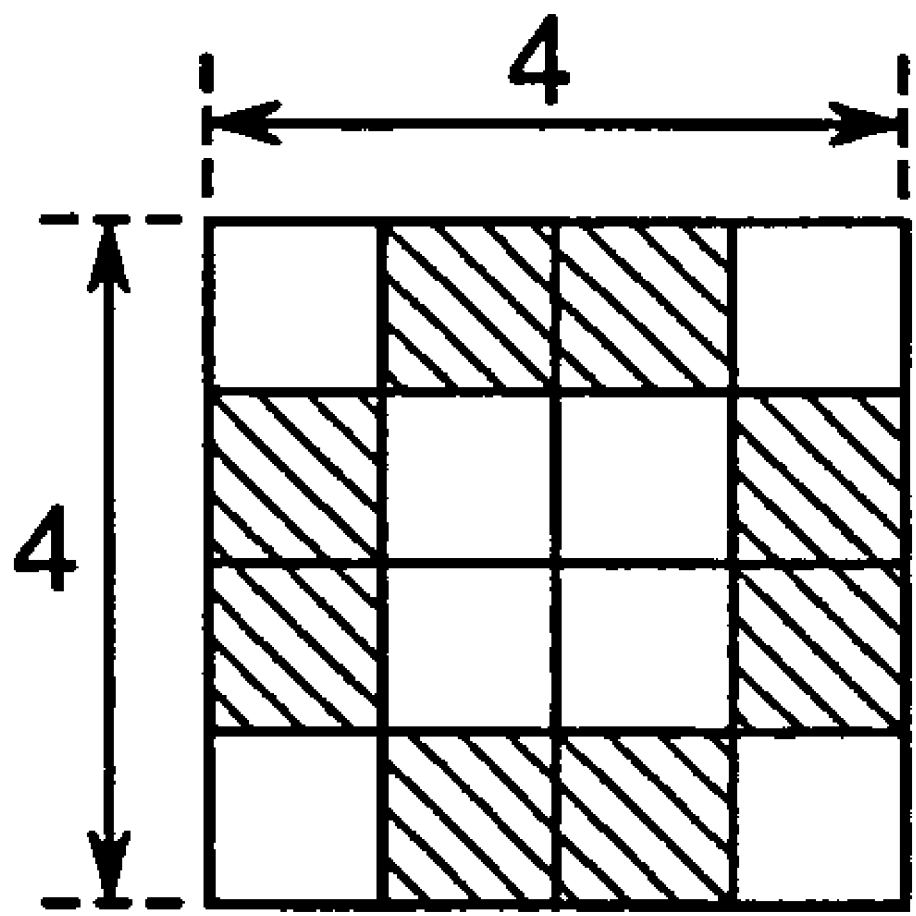
FIG. 6 shows the arrangement of the pixels that constitute an ideal element.
Figure 7A:
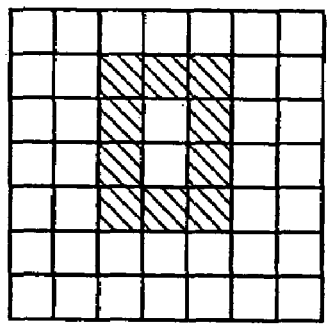
FIGS. 7A, 7B, 7C and 7D show various 7×7 pixel-block areas that contain recognition objects identified as element candidates.
Figure 7B:
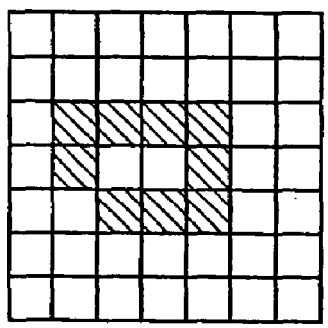
Figure 7C:
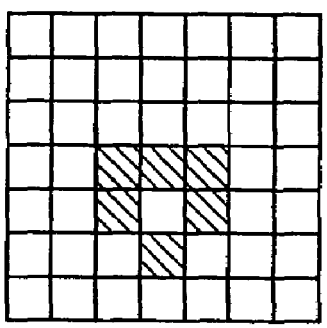
Figure 7D:
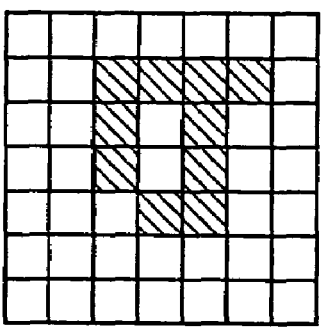
Figure 8A:
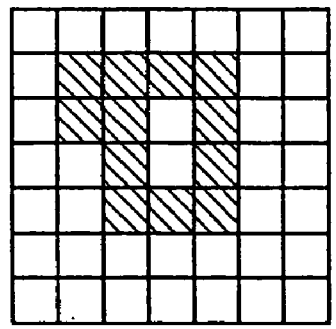
FIGS. 8A, 8B, 8C and 8D show various 7×7 pixel-block areas that contain recognition objects not identified as element candidates.
Figure 8B:
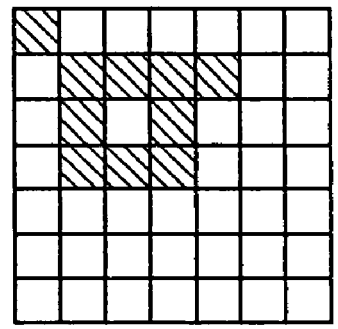
Figure 8C:
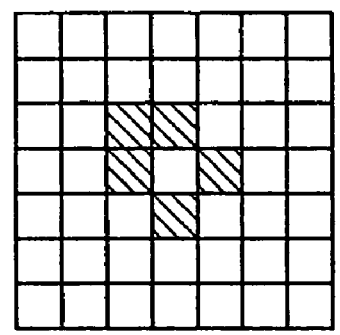
Figure 8D:
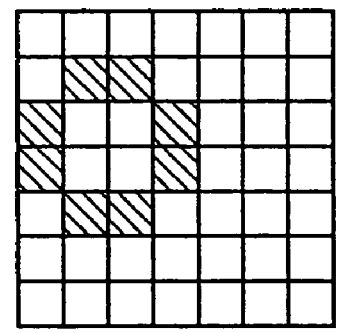

For example, as shown in FIG. 6, an ideal element is a circular image having an empty inside such that, in a 4×4 pixel-block area, ON-pixels are arranged on the upper, lower, left and right sides, and OFF-pixels are arranged at the four corners and the middle 2×2 pixel-block area. In FIG. 6, the pixels indicated by crosshatching are ON-pixels. For this ideal element, element-candidate determination is performed in a 7×7 pixel-block area. In this case, corresponding to the above conditions (1) and (2), the following conditions are established. The pixels constituting the outermost lines of the 7×7 pixel-block area are all OFF-pixels, and the number of ON-pixels contained in a 5×5 pixel-block area with its center being at an target pixel in the 7×7 pixel-block area falls within 6 to 10. As a result of the evaluation based on these conditions, various recognition objects contained in a 7×7 pixel-block area as shown in FIGS. 7A–7D are identified as element candidates. Although these recognition objects differ in shape or size from the ideal element shown in FIG. 6, they are identified as element candidates, since they satisfy the above conditions (1) and (2). In contrast, various recognition objects contained in a 7×7 pixel-block area as shown in FIGS. 8A–8D are not identified as element candidates, since they do not satisfy at least one of the above conditions (1) and (2).

The pixel-block areas containing recognition objects that have been identified as element candidates by the element-candidate determiner 31 are input to the element-candidate-size detector 32 and the final element determiner 34 at any time.

The element-candidate-size detector 32 receives a pixel-block area containing a recognition object that has been identified as an element candidate by the element-candidate determiner 31 and detects the size of the recognition object. The size of the recognition object is expressed in terms of the size of a rectangular pixel-block (that is, an m×n pixel-block) in which the recognition object can be framed. For example, if the recognition object is identical to the ideal element shown in FIG. 6, its size is expressed as a 4×4 pixel-block area. The detection results obtained by the element-candidate-size detector 31 are input to the OFF-pixel detector 33.

The OFF-pixel detector 33 receives the detection results from the element-candidate-size detector 31, and based on these detection results, extracts the pixel-block corresponding to the size of the detection object from a pixel-block area input from RAM 13 through memory controller 18. Next, in the extracted pixel-block, the OFF-pixel detector 33 sets a reference block consisting of an target pixel and the pixels in its predetermined neighborhood and detects OFF-pixels within the reference block. If detecting some OFF-pixels within the reference block, then the OFF-pixel detector 33 determines that the recognition object contained in the pixel-block area is an element having an empty inside.

FIGS. 9A to 9H show examples of set reference blocks in various pixel-blocks extracted as pixel-blocks corresponding to the sizes of recognition objects. In the illustrated various pixel-blocks, a pixel marked with a asteroid-shaped symbol represents an target pixel, and an area indicated by crosshatching is a reference block.

In 3×3 pixel-block 41 as shown in FIG. 9A, the target pixel is the center pixel, and only the center pixel is set as the reference block. If the target pixel is an OFF-pixel, then the recognition object is identified as an element having a predetermined shape. In 3×4 pixel-blocks 42 and 43 as shown in FIG. 9B, the target pixel is either one of the two pixels within the block, and a reference block consisting of the target pixel and a pixel adjacent to it within the block is set. For 3×4 pixel-blocks 42 and 43, where the positions of the target pixels differ from each other, the reference blocks are set on the same area within the block. This situation is similar to the case of 4×3 pixel-blocks 44 and 45 as shown in FIG. 9C.

Further, in 3×5 pixel-block 46 as shown in FIG. 9D, the target pixel is the center pixel, and a reference block consisting of the center pixel and the two pixels adjacent to it within the block is set. In 4×4 pixel-blocks 47, 48, 49, and 50 shown in FIG. 9E, the target pixel is one of the four pixels within the block, and the target pixel, and a reference block consisting of the target pixel and the three pixels adjacent to it within the block is set.

Also, in 5×3 pixel-block 51 as shown in FIG. 9F, the target pixel is the center pixel, as in 3×5 pixel-block 46 shown in FIG. 9D, and a reference block consisting of the center pixel and the two pixels adjacent to it within the block is set. Further, in 4×5 pixel-blocks 52 and 53 as shown in FIG. 9G, the target pixel is one of the two pixels in the neighborhood of its center within the block, and a reference block consisting of the target pixel and the five pixels adjacent to it within the block is set. This situation is similar to the case of 5×4 pixel-blocks as shown in FIG. 9H.

Thus, the size of the above reference block varies with the extracted pixel-block area, i.e. the size of the recognition object identified as an element candidate by the element-candidate determiner 31. This fact means that various kinds of processing resolution and element size can be accommodated.

The detection results obtained by the OFF-pixel detector 33 are sent to the final element determiner 34.

The final element determiner 34 receives determination results from the element-candidate determiner 31 and detection results from the OFF-pixel detector 33, and based on these results, determines whether the recognition object contained in the pixel-block area is an element. The determination results are sent to and stored in RAM 13 through the memory controller 18.

By means of the processing described above, the recognition objects that do not all satisfy various conditions are excluded. Thus, recognition elements more agreeing with the ideal element shown in FIG. 6 are selected, and particularly, elements with empty insides can be recognized with high precision. Also, in this embodiment, the element-recognition processing as described above is performed after the resolution of the image data is lowered, so that the speedup of processing and saving of used memory can be achieved. Further, in this embodiment, the elements are approximately circular images having empty insides, so that the shape to be recognized can be identified with relatively simple conditions that are symmetric for the upper and lower sides, left and right sides.

Figure 10:
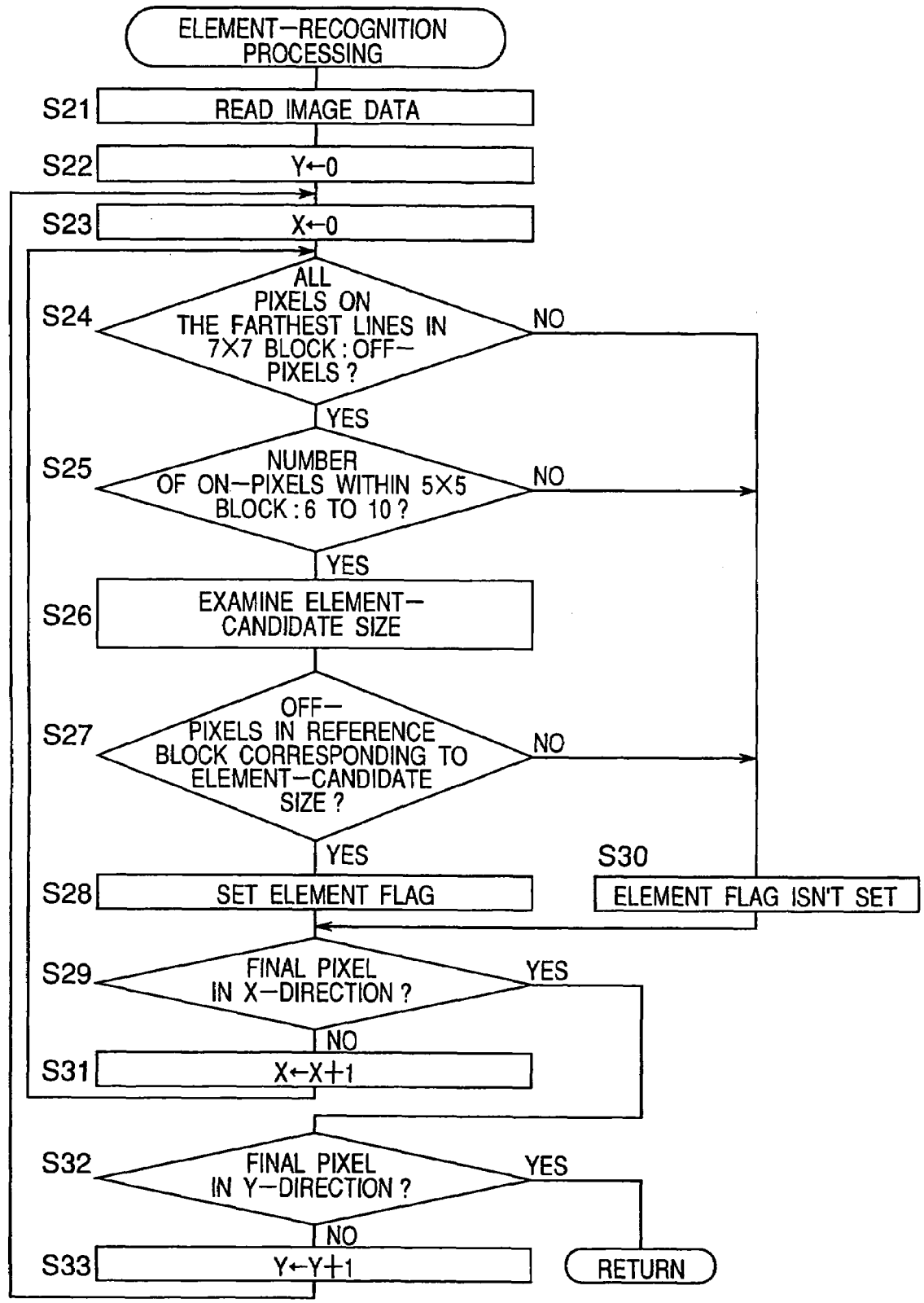
FIG. 10 is a flowchart of element-recognition processing in accordance with the first embodiment of the present invention.

FIG. 10 is a flowchart of element-recognition processing (S13 of FIG. 4) and shows the processing flow in the element-recognition processor 24 of FIG. 5. In this processing, for example, the image data is scanned by a filter of the size in which the ideal element shown in FIG. 6 can be framed, and whether the determination conditions as described above are satisfied or not is determined. In this flowchart, the processing is described for the case where a filter corresponding to a 7×7 pixel-block area is used.

In the present processing, first, the binary image data that has been stored after its resolution was lowered is read (S21). Next, the start position of scanning by the filter is determined. That is, for the scanning filter, the Y-axis is set at the upper end of the image data (S22), and the X-axis is set at the left end of the image data (S23).

When scanning is started, it is determined whether the outermost lines of the 7×7 pixel-block area all consist of OFF-pixels (S24) for the 7×7 pixel-block area within the filter. After the determination, if not all pixels are OFF-pixels, it is determined that the recognition object within the pixel-block area is not an element, and the element flag is set at OFF (S29). Then the flow proceeds with S30. On the other hand, if all are OFF-pixels, then the flow proceeds with S25. In S25, it is determined whether the number of ON-pixels within the 5×5 pixel-block area falls within 6 to 10. As a result, if it does not fall within 6 to 10 in the result, the element flag is set at OFF (S29), and the flow proceeds with S30. If the number is from 6 to 10, the flow proceeds with S26.

In S26, the size of the element candidate contained in the 7×7 pixel-block area is examined. In S27, it is determined whether OFF-pixels exist within a reference block corresponding to the size of the element candidate and set in the 5×5 pixel-block. If OFF-pixels do not exist, then the element flag is set at "OFF" (S29), and the flow proceeds with S30. On the other hand, if OFF-pixels exist, then the flow proceeds with S28. In S28, the recognition object within pixel-block area is identified as an element having a predetermined shape, since all of the conditions tested in S24, S25, and S27 are satisfied. Then, the element flag is set at "ON", and the flow proceeds with S30.

In S30, it is determined whether the 7×7 pixel-block area that is the recognition object is the last pixel-block area in the X-direction. If the 7×7 pixel-block area is not the last one, then the filter is shifted by one pixel in the X-direction (S31), and the flow returns to S24 to follow the subsequent steps. On the other hand, if the 7×7 pixel-block area is the last one, then the flow proceeds with S32, and whether the 7×7 pixel-block area is the last pixel-block area in the Y-direction is determined. If the 7×7 pixel-block area is not the last one, then the filter is shifted by one pixel in the Y-direction (S33), and the flow returns to S23 to follow the subsequent steps. On the other hand, if the 7×7 pixel-block area is the last one, then the element-recognition processing is terminated and the flow returns to the main routine.

In the above embodiment, the pattern-detection processor and element-recognition processor are configured as hardware circuits, and execution timing for each processing block is controlled by CPU 11 with programs stored in ROM 12. However, the pattern-detection processing and element-recognition processing as described above can be performed by means of software processing executed by CPU operations. In this case, programs including the pattern-detection algorithm and element-recognition algorithm are stored in ROM 12, and each processing is executed by CPU 11 with these programs. Also, these programs can be stored in file form in an external storage medium such as a floppy disk, CD-ROM and the like.

Further, the hardware configuration of the element-recognition processor 24 described with reference to FIG. 5 can be modified. For example, a pixel-block area can be simultaneously input to the element-candidate determiner 31, the element-candidate-size detector 31, and the OFF-pixel detector 33 from RAM 13, and then, the determination and detection results obtained by the element-candidate determiner 31 and the final element determiner 34 can be individually input to the final element determiner 34. In this case, in the final element determiner 34, the determination and detection results can be evaluated together to determine whether the recognition object is an element having a predetermined shape.

Next, another embodiment of the present invention is described. In the following, the same components as in the first embodiment described above are labeled with the same symbols and their descriptions are omitted.

Second Embodiment

Figure 11:
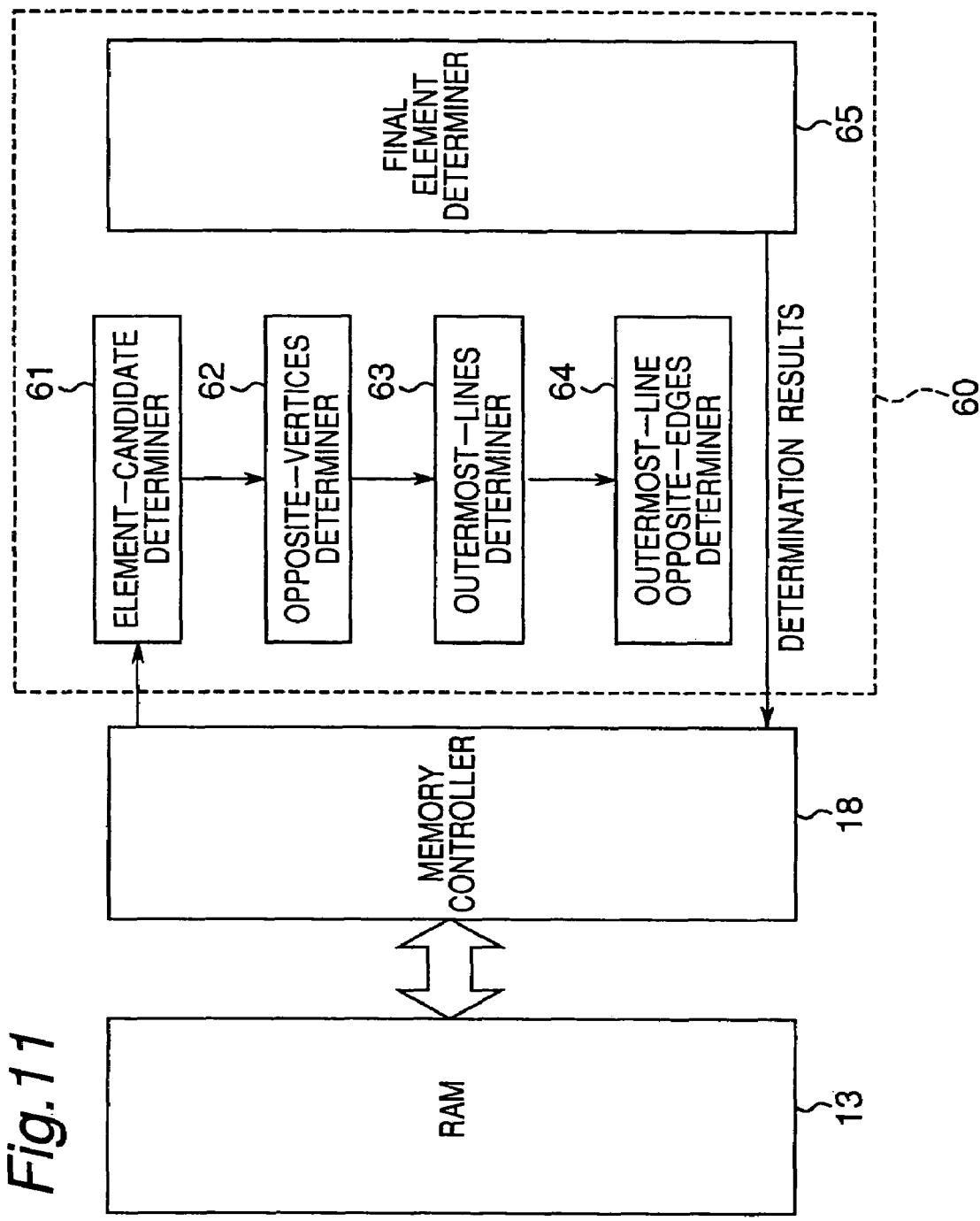
FIG. 11 is a block diagram that illustrates an element-recognition processor in the pattern-detection processor in accordance with a second embodiment of the present invention.

FIG. 11 is a block diagram that shows the configuration of an element-recognition processor 60 in a pattern-detection processor in accordance with a second embodiment of the present invention. This element-recognition processor 60 has an element-candidate determiner 61 that evaluates recognition objects in image data, based on predetermined conditions, to identify recognition objects satisfying the conditions as "element candidates", an opposite-vertices determiner 62 that determines pixel information at opposite vertices of a pixel-block area containing the recognition object, a outermost-lines determiner 63 that determines pixel information on the outermost lines of the above pixel-block area, a outermost-line opposite sides determiner 64 that determines pixel information on opposite sides of the outermost lines of the above pixel-block area, and a final element determiner 65 that receives the determination results from these components to perform a final determination for an element. In this second embodiment, the reading and writing of data performed between the element-recognition processor 60 and RAM 13 are controlled by a memory controller 18.

The memory controller 18 derives, during the element-recognition processing, the address of RAM 13 in which the binary image data is stored, and successively reads first pixel-block areas in the binary image data from RAM 13. These first pixel-block areas are rectangular block-areas consisting of m×n pixels with their center being at target pixels. The size of a pixel-block area is determined based on processing resolution and the size of an ideal element. The pixel-block areas read by the memory controller 18 are input to the element-candidate determiner 61.

The element-candidate determiner 61 evaluates recognition objects in input pixel-block areas based on predetermined conditions to identify recognition objects satisfying the conditions as element candidates. The predetermined conditions are that (1) the pixels constituting the outermost lines of a pixel-block area are all OFF-pixels, and that (2) the number of ON-pixels contained in a predetermined area with its center being at an target pixel in the pixel-block area falls within a prescribed range. The determination processing is the same as the processing performed by the element-candidate determiner 31 described with reference to FIGS. 6 to 8 in the first embodiment described above, and so, the description is omitted.

The pixel-block areas containing recognition objects that have been identified as element candidates by the element-candidate determiner 61 are input to the opposite-vertices determiner 62.

The opposite-vertices determiner 62 first extracts, from the first pixel-block area containing a recognition object identified as an element candidate by the element-candidate determiner 61, a second pixel-block area containing the recognition object. For example, in a 7×7 pixel-block area that has been identified as an element candidate, since the outermost lines consist of OFF-pixels only based on the above condition (1), a 5×5 pixel-block area is extracted as the second pixel-block area containing a recognition object. Then, the pixel-block area containing the recognition object is evaluated based on the condition that the number of OFF-pixels in each pixel pair that is located at opposite vertices is less than 2.

Figure 12:
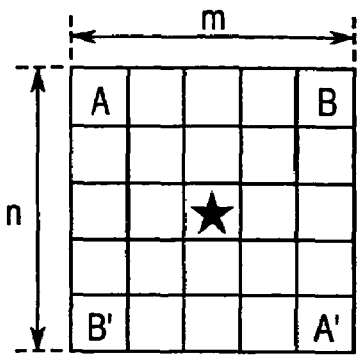
FIG. 12 illustrates the determination conditions for pixel information at opposite vertices in accordance with the second embodiment of the present invention.

The determination processing performed by the opposite-vertices determiner 62 is explained with reference to FIG. 12. The object to be processed is a 5×5 pixel-block area that contains a recognition object with its center being at an target pixel. In this 5×5 pixel-block area, there exist pixel pairs (A,A') and (B,B') located at opposite vertices. In the determination, A+A', and B+B' are evaluated, where the value for an ON-pixel is 1 and the value for an OFF-pixel is 0. Then, if $A+A'<2$, and $B+B'<2$, then the recognition object in the 5×5 pixel-block area is identified as an element. According to this determination processing, recognition objects having two pixels at opposite vertices can be excluded, so that a recognition object agreeing with the ideal element shown in FIG. 6 can be selected.

The pixel-block areas containing recognition objects that have been identified as element candidates by the opposite-vertices determiner 62 are input to the outermost-lines determiner 63.

Figure 13:
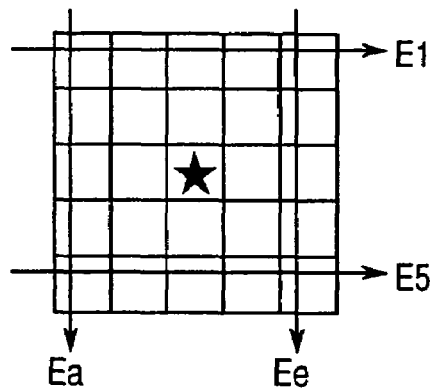
FIG. 13 illustrates the determination conditions for pixel information on the outermost lines in accordance with the second embodiment of the present invention.

The outermost-lines determiner 63 determines pixel information on the outermost lines of the second pixel-block area containing a recognition object. That is, the second pixel-block area containing a recognition object is evaluated based on the condition that the number of ON-pixels on the outermost lines is not larger than a predetermined number. This determination process is explained here with reference to FIG. 13. The object to be processed is a 5×5 pixel-block area that contains a recognition object with its center being an target pixel. In this 5×5 pixel-block area, there exist outermost lines E1 and E5 in the horizontal direction and Ea and Ee in the vertical direction. In the determination E1, E5, Ea and Ee are evaluated, where the value for an ON-pixel is 1 and the value for an OFF-pixel is 0. Then, if $E1 \leq 4$ $E5 \leq 4$ $Ea \leq 4$, and $Ee \leq 4$, then the recognition object within the 5×5 pixel-block area is determined to be an element.

The pixel-block areas containing recognition objects and determined to be elements by the outermost-lines determiner 63 are input to the outermost-line opposite sides determiner 64.

Figure 14:
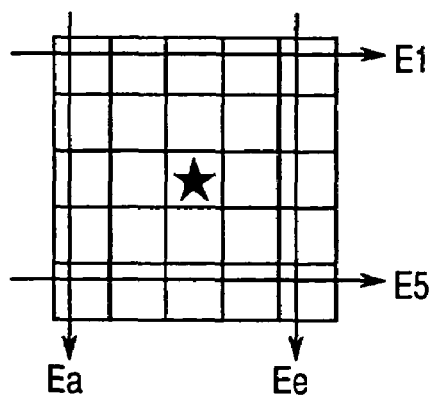
FIG. 14 illustrates the determination conditions for pixel information on opposite sides on the outermost lines in accordance with the second embodiment of the present invention.

The outermost-line opposite-sides determiner 64 determines pixel information on opposite sides of the outermost lines in the second pixel-block area containing a recognition object. The second pixel-block area containing a recognition object is evaluated based on the condition that the number of ON-pixels on each pair of outermost lines that constitute opposite sides is not larger than a predetermined number. The determination processing is explained here-with reference to FIG. 14. The object to be processed is a 5×5 pixel-block area that contains a recognition object with its center being at an target pixel. In this 5×5 pixel-block area, there exist the outermost line pairs (E1,E5) and (Ea,Ee) that constitute opposite sides. In the determination, E1+E5 and Ea+Ee are evaluated, where the value for an ON-pixel is 1 and the value for an OFF-pixel is 0. Then, if $E1+E5 \leq 5$, and $Ea+Ee \leq 5$, then the recognition object in 5×5 pixel-block area is identified as an element.

The pixel-block areas containing recognition objects identified as elements by the outermost-line opposite sides determiner 64 are input to the outermost-line opposite sides determiner 64.

The final element determiner 65 receives pixel-block areas from the outermost-line opposite sides determiner 64 and determines whether the recognition objects contained in the pixel-block areas are elements. The determination results are sent to and stored in RAM 13 through the memory controller 18.

By means of the processing described above, the recognition objects that do not all satisfy various conditions are excluded. Thus, recognition elements more agreeing with the ideal element shown in FIG. 6 are selected, and an element can be recognized with high precision. Also, in this embodiment, since the element-recognition processing as described above is performed after the resolution of the image data is lowered, the speedup of processing and saving of used memory can be achieved. Further, in this embodiment, the elements are approximately circular images having empty insides, so that the shape to be recognized can be determined with relatively simple conditions that it is symmetric for the upper and lower sides, left and right sides.

Figure 15:
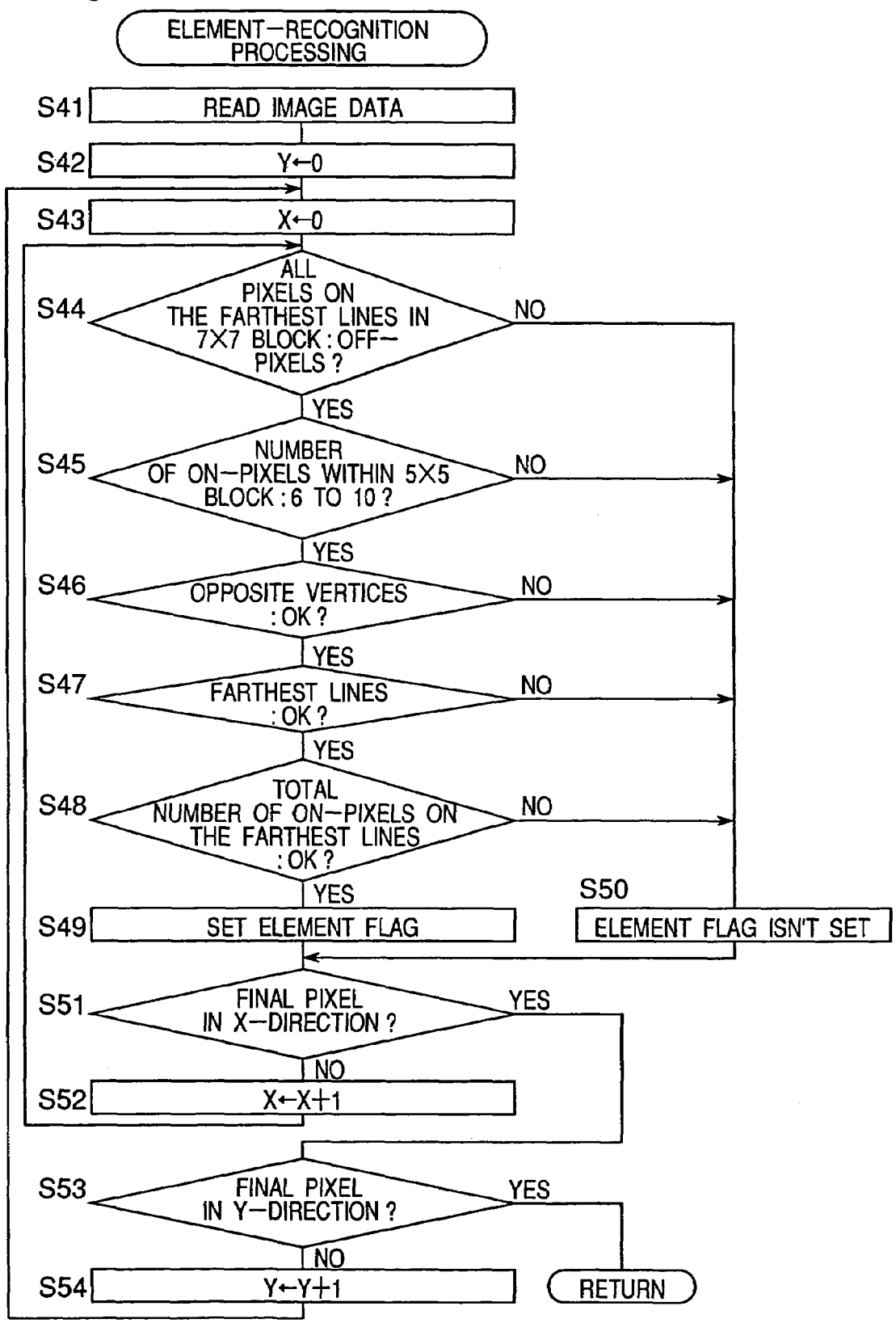
FIG. 15 is a flowchart of element-recognition processing in accordance with the second embodiment of the present invention.

FIG. 15 is a flowchart of element-recognition processing and shows the processing flow in the element-recognition processor 60 of FIG. 11. In this processing, the image data is scanned by a filter of the size in which the ideal element, for example, shown in FIG. 6 can be framed, and whether the determination conditions as described above are satisfied or not is determined. In this flowchart, the processing is described for the case where a filter corresponding to a 7×7 pixel-block area is used.

In the present processing, first, the binary image data that has been stored after its resolution was lowered is read (S41). Next, the start position of scanning by the filter is determined. That is, for the scanning filter, the Y-axis is set at the upper end of the image data (S42), and the X-axis is set at the left end of the image data (S43).

When scanning is started, it is determined whether the outermost lines of the 7×7 pixel-block area all consist of OFF-pixels (S44). After the determination, if the pixels on the outermost line are not all are not OFF-pixels, it is determined that the recognition object within the pixel-block area is not an element, and the element flag is set at OFF (S50). Then the flow proceeds with S51. On the other hand, if all are OFF-pixels, then the flow proceeds with S45. In S45, it is determined whether the number of ON-pixels within the 5×5 pixel-block area falls within 6 to 10. If the number is not from 6 to 10 in the result, the element flag is set at "OFF" (S50), and the flow proceeds with 351. If it does not fall within 6 to 10, the flow proceeds with S46.

The recognition object that has satisfied the conditions of both S44 and S45 is determined as an "element candidate", and it is further determined whether the element candidate satisfies the determination conditions as described above with reference to FIGS. 12 to 14 (S46 to S48). First, in S46, the number of ON-pixels on opposite vertices in the 5×5 pixel-block area is determined. That is, it is determined whether the number of ON-pixels at each pair of opposite vertices is less than 2. If at least one of the numbers is not less than 2, then the element flag is set at OFF (S50), and the flow proceeds with S51. On the other hand, if both numbers are less than 2, then the flow proceeds with S47.

In S47, the outermost lines in the 5×5 pixel-block area are determined. That is, it is determined whether the number of ON-pixels on each outermost line is not larger than 4. If at least-one of the numbers is larger than 4, then the element flag is set at "OFF" (S50), and the flow proceeds with S51. On the other hand, if numbers are less than 5, then the flow proceeds with S48.

Next, in S48, the numbers of ON-pixels on opposite sides in the outermost lines of the 5×5 pixel-block area are determined. That is, it is determined whether the number of ON-pixels on each pair of opposite sides in the outermost lines of the 5×5 pixel-block area is not larger than 5. If at least one of the numbers is larger than 5, then the element flag is set at "OFF" (S50), and the flow proceeds with S51. If both numbers are less than 6, then the flow proceeds with S49. In S49, the recognition object in the pixel-block area is identified as an element, since all of the conditions tested in S44 to S48 are satisfied. Then, the element flag is set at "ON", and the flow proceeds with S51.

In S51, it is determined whether the 7×7 pixel-block area for a recognition object is the last pixel-block area in the X-direction. If the 7×7 pixel-block area is not the last one, then the filter is shifted by one pixel in the X-direction (S52), and the flow returns to S44 to follow the subsequent steps. On the other hand, if the 7×7 pixel-block area is the last one, then the flow proceeds with S53, and whether the 7×7 pixel-block area is the last pixel-block area in the Y-direction is determined. If the 7×7 pixel-block area is not the last one, then the filter is shifted by one pixel in the Y-direction (S54), and the flow returns to S43 to follow the subsequent steps. On the other hand, if the 7×7 pixel-block area is the last one, then the element-recognition processing is terminated and the flow returns to the main routine.

In the above embodiment, the pattern-detection processor and element-recognition processor are configured as hardware circuits, and execution timing for each processing block is controlled by CPU 11 with programs stored in ROM 12. However, the pattern-detection processing and element-recognition processing as described above can be performed by means of software processing executed by CPU operations. In this case, programs including the pattern-detection algorithm and element-recognition algorithm are stored in ROM 12, and each processing block is executed by CPU 11 with these programs. Also, these programs can be stored in file form in an external storage medium such as a floppy disk, CD-ROM and the like.

Further, the hardware configuration of the element-recognition processor 24 as described with reference to FIG. 11 can be modified. For example, a pixel-block area can be simultaneously input to each component (the element-candidate determiner 61, the opposite-vertices determiner 62, the outermost-lines determiner 63, and the outermost-line opposite sides determiner 64) from RAM 13, and then, the determination and detection results obtained by these components can be individually input to the final element determiner 65. In this case, in the final element determiner 65, the determination and detection results can be evaluated together to determine whether a recognition object is an element having a predetermined shape.

Third Embodiment

Figure 16:
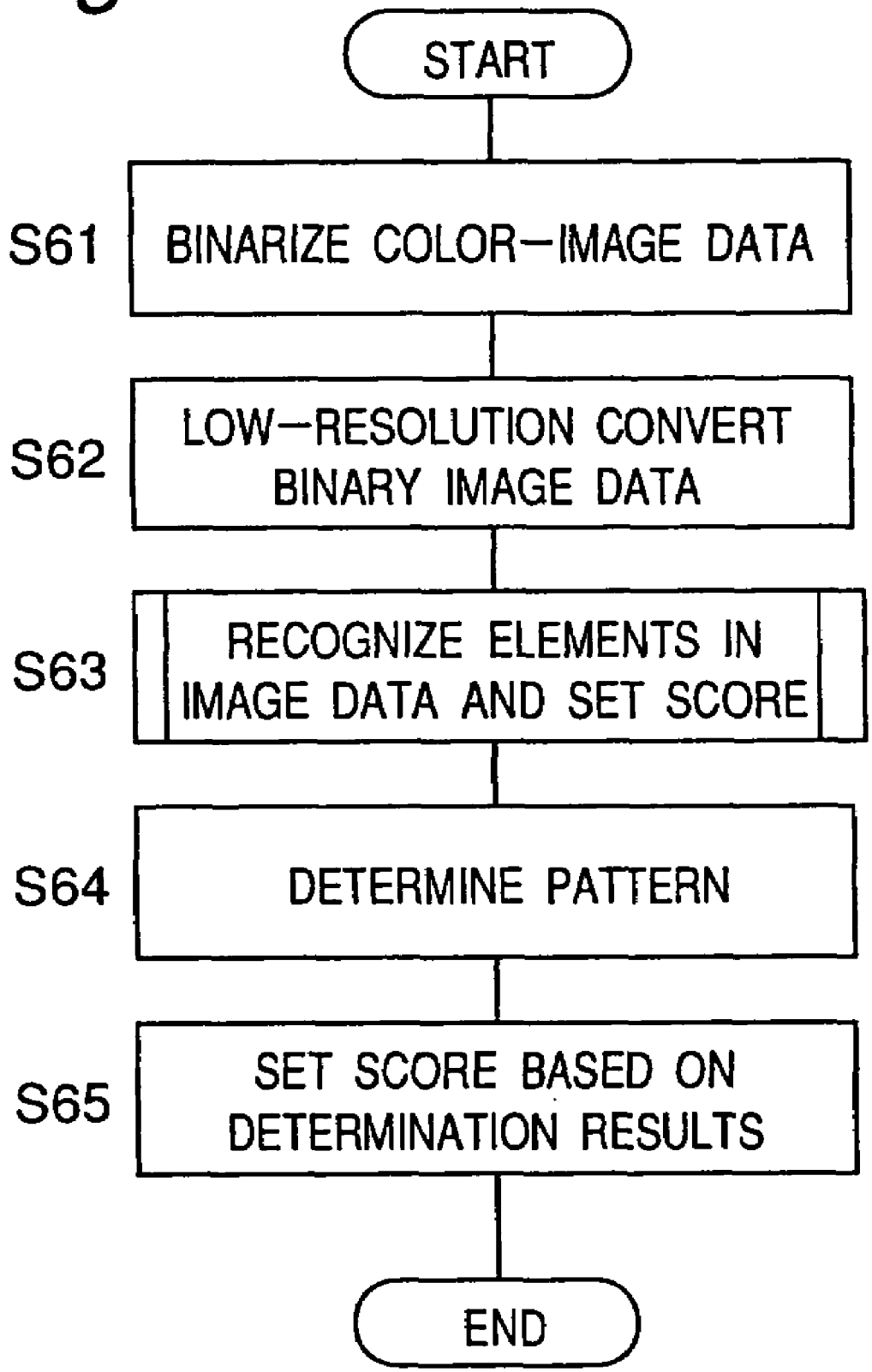
FIG. 16 is a flowchart of pattern-detection processing in accordance with a third embodiment of the present invention.

FIG. 16 is a flowchart of pattern-detection processing by a pattern-detection processor in accordance with a third embodiment of the present invention. In this pattern-detection processing, first, the color image data input from an image-input section is binarized for the pattern color (S61). Next, the binary image data is converted to low-resolution image data (S62). Then, the whole binary image data of which resolution has been lowered is successively scanned by a filter of m×n size in which an element can be framed, and elements contained in the image data are recognized and the score is provided for each element (S63).

Then, the binary image data is scanned by a filter of a size in which a specific pattern is framed, and the pattern is recognized based on the arrangement of the recognized element and the score of the element given in S63 (S64). Then, the obtained pattern determination results are evaluated, and a score corresponding to the results are set (S65). The pattern-detection processing is thus finished.

The element-recognition and score-setting processing (S63) and the pattern-determination processing (S64) are described in detail later with reference to FIGS. 19 and 23.

Figure 17:
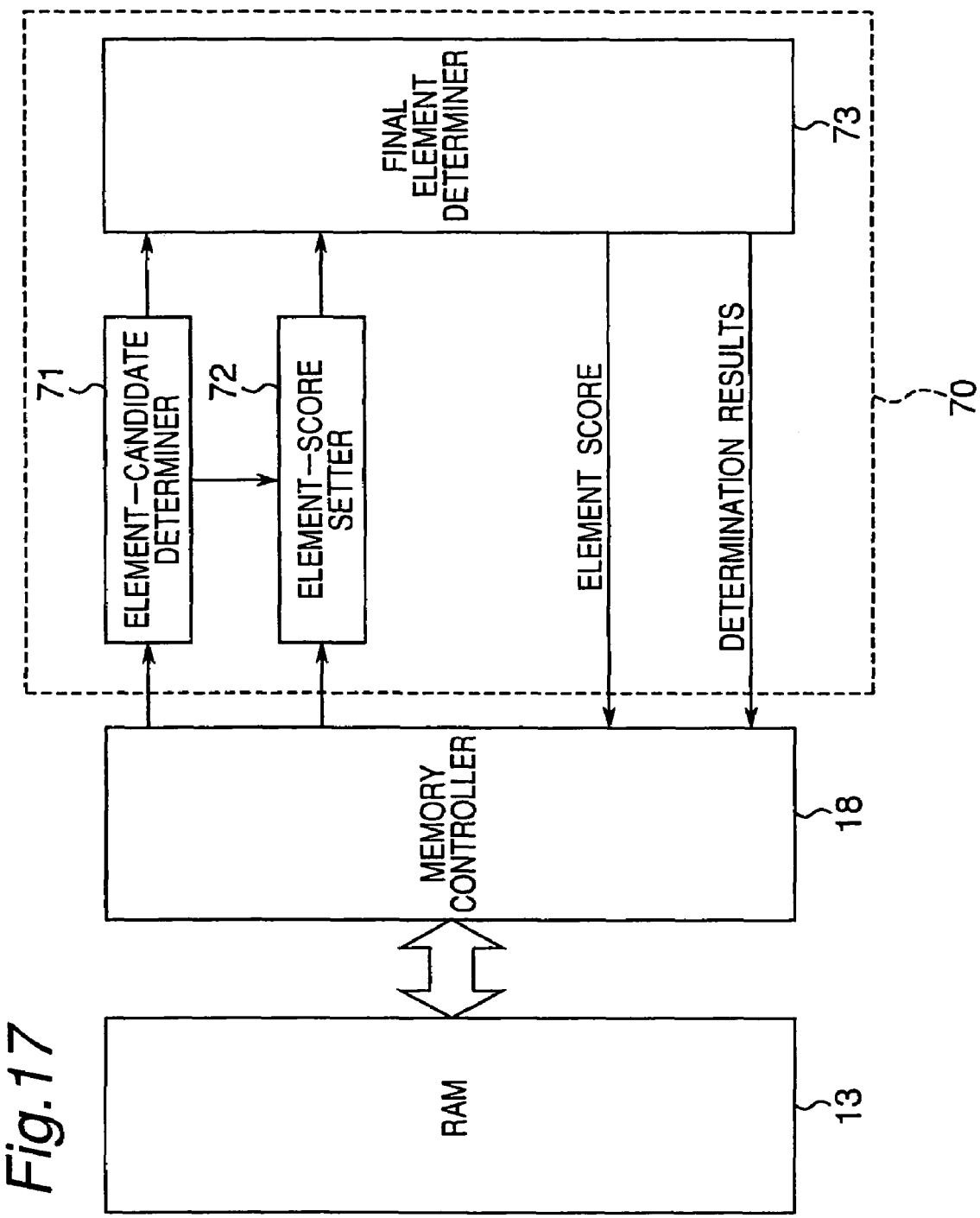
FIG. 17 is a block diagram that illustrates the configuration of an element-recognition processor in the pattern-detection processor in accordance with the third embodiment of the present invention.

FIG. 17 is a block diagram that illustrates the configuration of the element-recognition processor 70 in accordance with the third embodiment of the present invention. This element-recognition processor 70 has an element-candidate determiner 71 that evaluates recognition objects in the image data, based on predetermined conditions, to identify a recognition object satisfying the conditions as an "element candidate", an element-score setter 72 that sets a score for each element candidate, based on similarity between the element candidate and a reference element having a predetermined size and shape, and a final-element determiner 74 that receives the determination results from these components to perform a final determination for an element. In this embodiment, the reading and writing of data performed between the element-recognition processor 70 and RAM 13 are controlled by a memory controller 18.

The memory controller 18 derives, during the element-recognition processing, the address of RAM 13 where the binary image data is stored, and successively reads pixel-block areas in the binary image data from RAM 13. These pixel-block areas are rectangular block-areas consisting of m×n pixels with its center being at an target pixel. The size of a pixel-block area is determined based on processing resolution and the size of an ideal element. The pixel-block areas read by the memory controller 18 are input to the element-candidate determiner 71.

The element-candidate determiner 71 evaluates recognition objects in input pixel-block areas, based on predetermined conditions, to identify recognition objects satisfying the conditions as element candidates. The predetermined conditions are that (1) the pixels constituting the outermost lines of a pixel-block area are all OFF-pixels, and that (2) the number of ON-pixels contained in a predetermined area with its center being at an target pixel in the pixel-block area falls within a prescribed range. The determination processing is the same as the processing performed by the element-candidate determiner 31 in the first embodiment and described with reference to FIGS. 6 to 8. Therefore the explanation is omitted.

The pixel-block areas containing recognition objects that have been identified as element candidates by the element-candidate determiner 71 are input to the element-score setter 72 and the final-element determiner 73.

The element-score setter 72 sets a score for each element, based on similarity between the element contained in the pixel-block area input from the element-candidate determiner 71 and a reference element that is identical to an ideal element as shown in FIG. 6. The reference element is stored in a predetermined memory, e.g. ROM 12, and can be read at any time during the score setting. FIG. 18 shows various elements that have been scored based on the similarity to the reference element. The various elements are classified into shapes, and as a shape is more similar to the reference element, it gains a higher score. That is, if the shape is the same as that of the reference element, then the score 100 is set. If only one pixel of the shape is lacking, then the score 90 is set. If two pixels of the shape are lacking in total on opposite sides or adjacent edges, then the score 80 is set. If one of sides is lacking, then the score 70 is set.

It is noted that the score-setting processing is not limited to this procedure, and other various manners can be used as long as the scores can be provided for similarity to the reference elements.

The scoring results provided by the element-score setter 72 are input to the final element determiner 73 at any time.

The final element determiner 73 receives pixel-block areas from the element-candidate determiner 71 and determines whether recognition objects contained in the pixel-block areas are elements. The final element determiner 73 also receives scoring results from the element-score setter 72 and relates them to corresponding elements. The determination results and the element scores are sent to RAM 13 through the memory controller 18 and stored therein.

Figure 19:
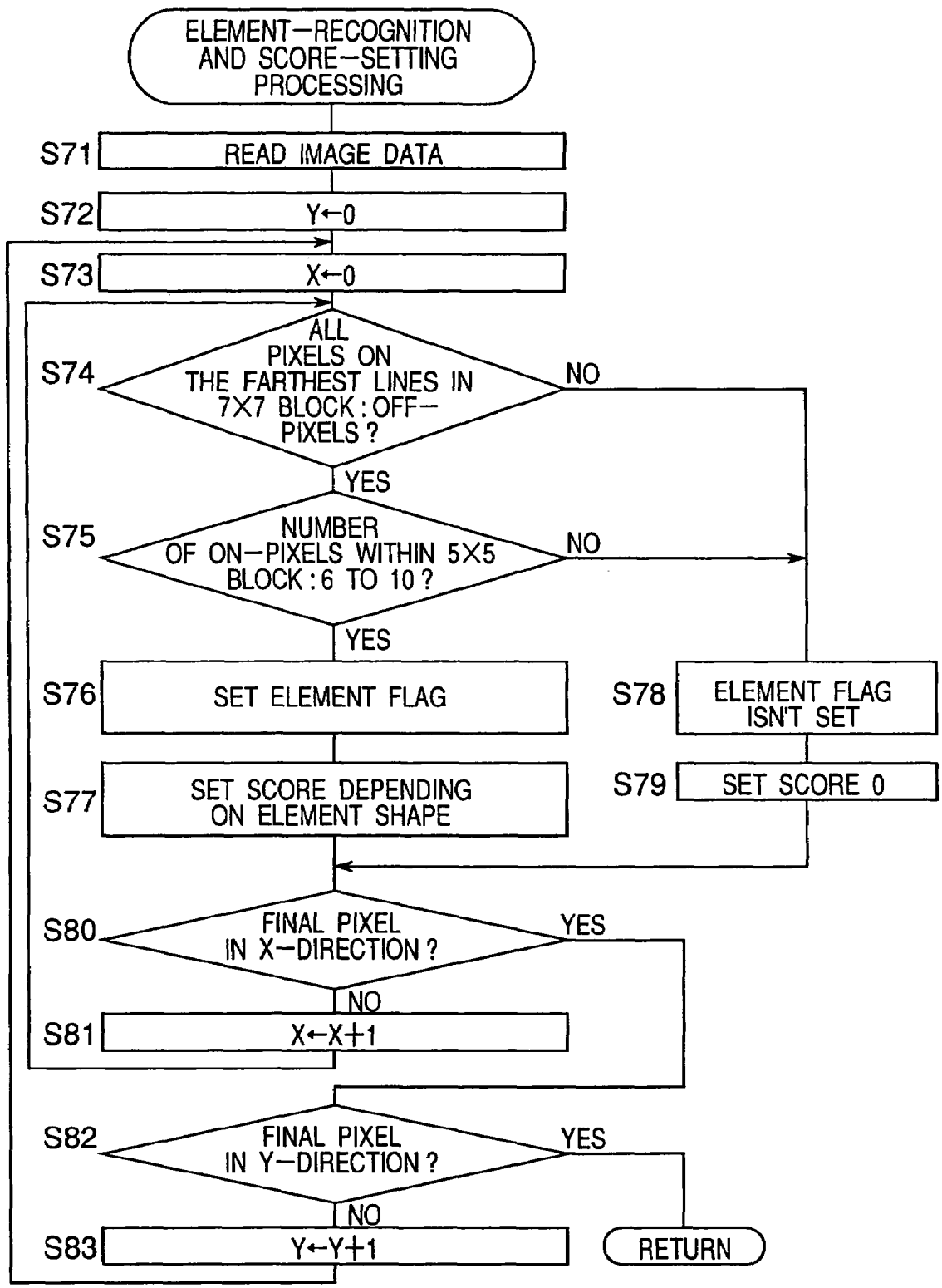
FIG. 19 is a flowchart of element-detection and score-setting processing in accordance with the third embodiment of the present invention.

FIG. 19 is a flowchart of element-recognition and score-setting processing (S63 of FIG. 16) and shows the processing flow in the element-recognition processor 70 of FIG. 17. In this processing, for example, the image data is scanned by a filter of the size in which the ideal element as shown in FIG. 6 can be framed, and whether the determination conditions described above are satisfied or not is determined.

In this flowchart, the processing is described for the case where a filter corresponding to a 7×7 pixel-block area is used. In the present processing, first, the binary image data that has been stored after its resolution was lowered is read (S71). Next, the start position of scanning by the filter is determined. That is, for the scanning filter, the Y-axis is set at the upper end of the image data (S72), and the X-axis is set at the left end of the image data (S73).

When scanning is started, for the 7×7 pixel-block area within a filter, it is determined whether the outermost lines of the 7×7 pixel-block area all consist of OFF-pixels (S74). After the determination, if the pixels are not all OFF-pixels, it is determined that the recognition object within the pixel-block area is not an element, and the element flag is set at "OFF" (S78). Then the score 0 is set (S79), and the flow proceeds with 80. On the other hand, if all are OFF-pixels, then the flow proceeds with S75. In S75, it is determined whether the number of ON-pixels within the 5×5 pixel-block area falls within 6 to 10. If it does not fall within 6 to 10 in the result, the element flag is set at "OFF" (S78), and the flow proceeds with S80. If the number falls within 6 to 10, the flow proceeds with S76.

In S76, the recognition object that has satisfied the conditions of both S74 and S75 is determined as an element candidate, and the element flag is set at "ON". Next, in S77, similarity of shapes between the element and the reference element is evaluated and a score is set for the element. Further, in S80, it is determined whether the 7×7 pixel-block area that is a recognition object is the last pixel-block area in the X-direction. If the 7×7 pixel-block area is not the last one, then the filter is shifted by one pixel in the X-direction (S81), and the flow returns to S74 to follow the subsequent steps. On the other hand, if the 7×7 pixel-block area is the last one, then the flow proceeds with S82, and whether the 7×7 pixel-block area is the last pixel-block area in the Y-direction. If the 7×7 pixel-block area is not the last one, then the filter is shifted by one pixel in the Y-direction (S83), and the flow returns to S73 to follow the subsequent steps. On the other hand, if the 7×7 pixel-block area is the last one, then the score-setting processing is terminated and the flow returns to the main routine.

Thus, in the element-recognition and score-setting processing described above, a score is set for each element, based on similarity between the element and the reference element, so that recognition precision for each element is relatively evaluated.

Next, the determination processing for a specific pattern, based on the arrangement of elements recognized and scores set by the element-recognition and score-setting processing in S71 to S83 of FIG. 19, is now described. In this determination processing, binary-image data is successively scanned by a filter in which a specific pattern can be framed. Then, in each area of the image data, the arrangement of the recognized elements within the filter is evaluated, and the total score for the elements is calculated. Then, if the sum of a score representing the fitness of the arrangement of the elements to the arrangement of an ideal pattern and the total score for the elements is not less than a predetermined value, then it is determined that the elements recognized within the filter constitute the specific pattern.

Figure 20:
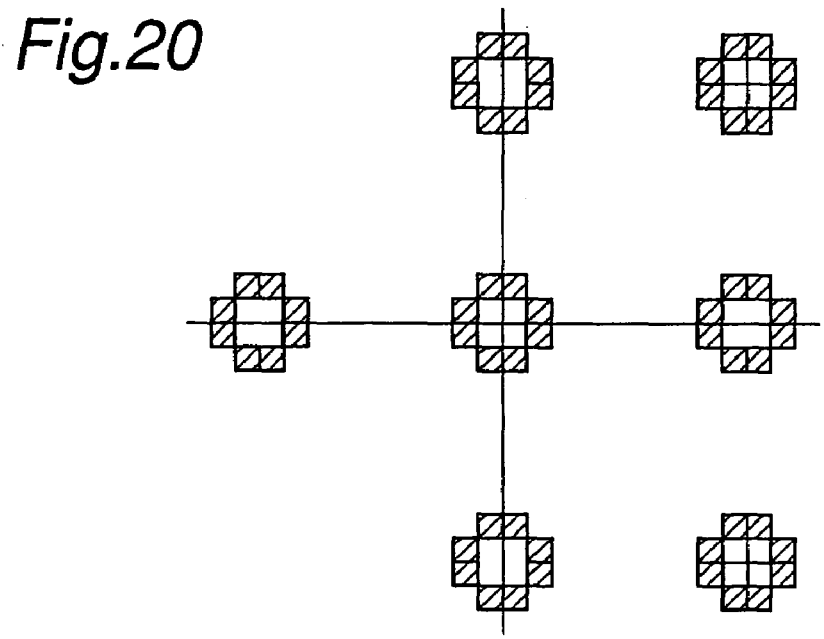
FIG. 20 shows the arrangement of the elements that constitute an ideal pattern.
Figure 21:
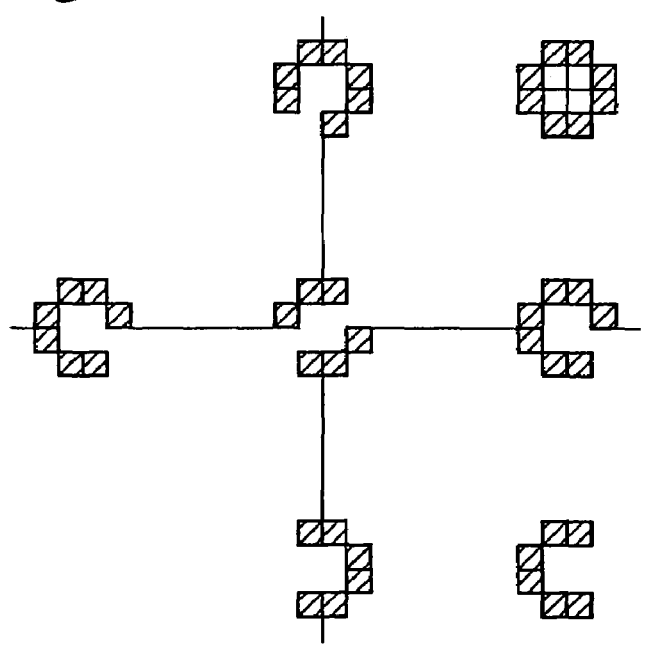
FIG. 21 shows a pattern composed of elements having set scores and determination results.
Figure 22:
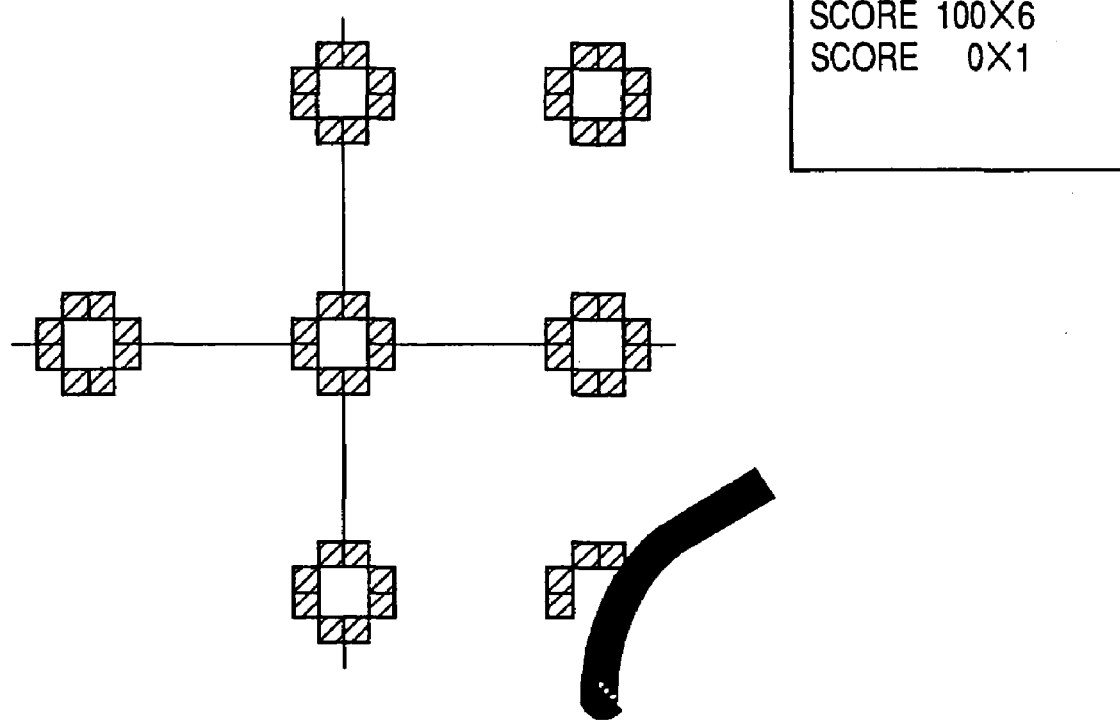
FIG. 22 shows another pattern composed of elements having set scores and determination results.

For example, let an ideal pattern be a pattern that is composed of seven elements arranged in such a way as shown in FIG. 20, and the case where two patterns shown in FIGS. 21 and 22 have been recognized is considered. In the pattern shown in FIG. 21, the arrangement of the elements agrees with that of the ideal pattern. The shapes of the elements have some irregularities with the total score 520. In this case, the pattern is identified as the specific pattern.

On the other hand, the pattern shown in FIG. 22, one of the seven elements (lower right element) is smeared and corrupted, so that the arrangement does not agree with that of the ideal pattern. However, the shapes of the other six elements are the same as the reference element, so that the total score for the elements is 600. In this case, the pattern is identified as the specific pattern.

Figure 23:
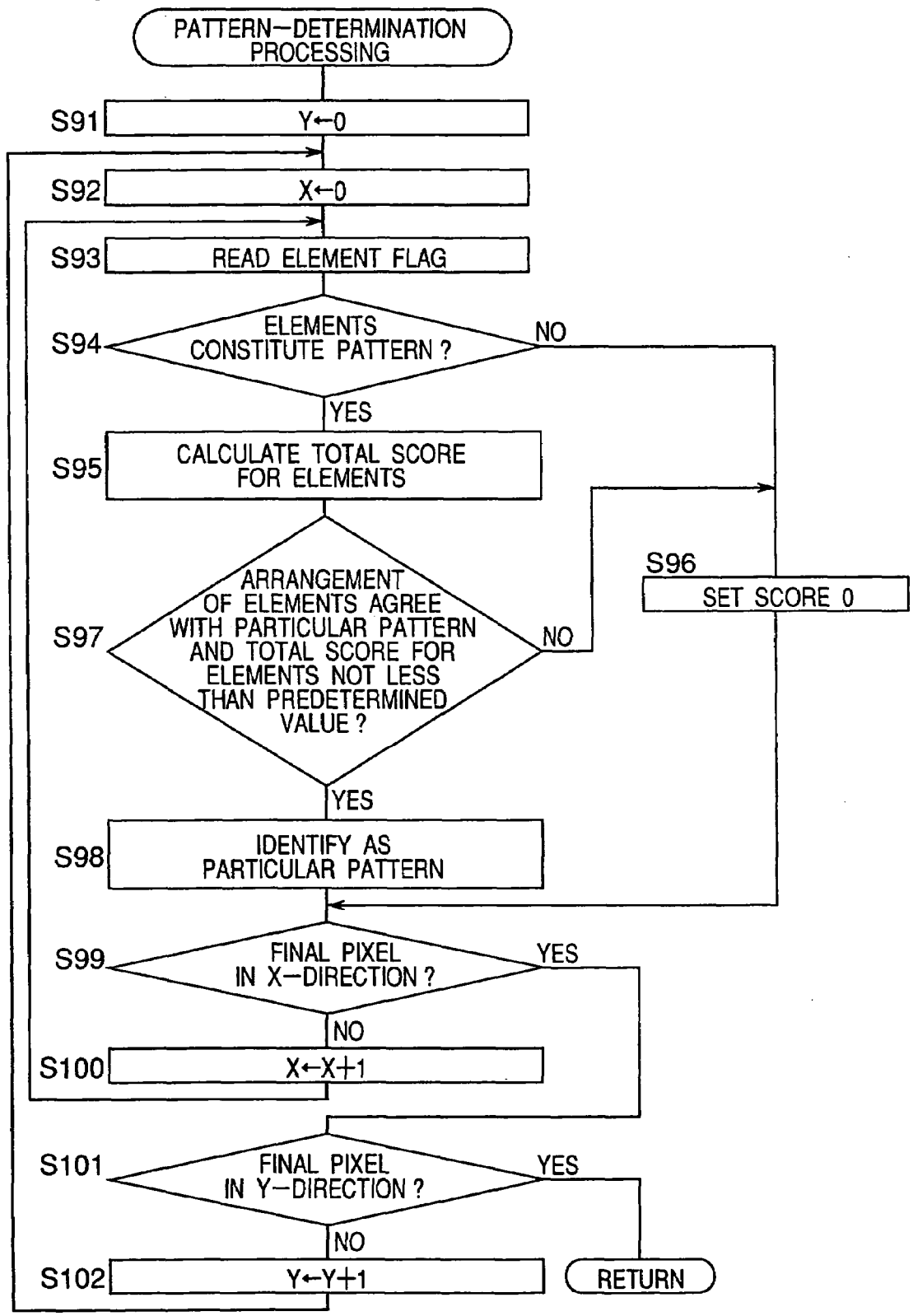
FIG. 23 is a flowchart of specific pattern determination processing in accordance with the third embodiment of the present invention.

FIG. 23 is a flowchart of the pattern-determination processing described above and shows the processing flow in a pattern-determination processor in accordance with the third embodiment of the present invention. In this processing, image data is scanned by a filter in which an ideal pattern as shown in FIG. 20, for example, can be framed. Then, elements contained and recognized in a pixel-block area corresponding to the filter are considered. In the present processing, first, the start position of scanning by the filter is determined. That is, for the scanning filter, the Y-axis is set at the upper end of the image data (S91), and the X-axis is set at the left end of the image data (S92). Next, the element flag set for each element recognized in a flame is read (S93), and whether the elements constitute the pattern is determined, depending on whether the fitness for pattern matching is not less than a predetermined threshold value (S94). If the elements do not constitute the pattern, then the score 0 is set (S96), and flow proceeds with S99. If the elements constitute the pattern, then the total score for the elements is calculated (S95).

Next, in S97, it is determined whether the sum of the score representing the fitness of the arrangement of the elements to the arrangement of an ideal pattern and the total score for the elements is not less than a predetermined value. If the sum is less than the predetermined value, then it is determined that the elements do not constitute the pattern, so that the score 0 is set (S96), and the flow proceeds with S99. On the other hand, if the sum is not less than the predetermined value, then it is determined that the elements constitute the specific pattern (S98), and the flow proceeds with S99.

In S99, it is determined whether the block area to be determined is the last pixel-block area in the X-direction. If the block area is not the last one, then the filter is shifted by one pixel in the X-direction (S100), and the flow returns to S93 to follow the subsequent steps. On the other hand, if the block area is the last one, then the flow proceeds with S101, and it is determined whether the block area is the last pixel-block area in the Y-direction. If the block area is not the last one, then the filter is shifted by one pixel in the Y-direction (S102), and the flow returns to S92 to follow the subsequent steps. On the other hand, if the block area is the last one, then the pattern-determination processing is terminated and the flow returns to the main routine.

In the above pattern-determination processing, the arrangement of the elements contained in a predetermined pixel-block area is evaluated as well as the scores set for the individual elements by the element-recognition and score-setting processing, and the recognition precision for elements contained in the pixel-block is synthetically determined. Therefore, a specific pattern can be detected with high precision.

In the above embodiment, the pattern-detection processor and element-recognition processor are configured as hardware circuits, and execution timing for each processing block is controlled by CPU 11 with programs stored in ROM 12. However, the pattern-detection and element-recognition processing as described above can be performed as software processing executed by CPU operations. In this case, programs including the pattern detecting algorithm and element-recognition algorithm are stored in ROM 12, and each processing block is, executed by CPU 11 with these programs. Also, these programs can be stored in file form in an external storage medium such as a floppy disk, CD-ROM and the like.

Further, the hardware configuration of the element-recognition processor 70 described with reference to FIG. 17 can be modified. For example, a pixel-block area can be simultaneously input to each component (the element-candidate determiner 71 and the element-score setter 72) from RAM 13, and then, the determination results and element scores can be individually input to the final element determiner 73. In this case, in the final element determiner 73, the determination results and element scores can be evaluated together to provide a score representing similarity to the specific pattern for the recognition-object that has been determined as an element.

Finally, it is obvious that the present invention is not limited to the embodiments described above, and various kinds of modifications and changes in designing may be possible without departing from the scope of the present invention.

What is claimed is:

1. A pattern-detection apparatus that detects a specific pattern contained in an image, said pattern-detection apparatus comprising:

a binarizing unit that binarizes input image data to obtain binary image data, a first partial-image recognition unit that tests for a partial image contained in said binary image data, and that is part of said specific pattern and has an empty inside, wherein said partial-image recognition unit successively scans, in said binary image data, a pixel-block area of a predetermined size containing a target pixel, and said partial-image recognition unit determines if outermost lines of the pixel-block area are all OFF pixels and if a total number of ON pixels within the pixel-block area is within a prescribed range, a secondary partial-image recognition unit that tests the pixel-block area to obtain additional data concerning the pixels therein for purposes of determining the specific pattern, and a specific pattern determination unit that determines whether said specific pattern is contained in said binary image data, based on the recognition results obtained by said first partial-image recognition unit and the data obtained by secondary partial-image recognition unit.

2. The pattern-detection apparatus of claim 1, wherein said partial-image recognition unit changes the size of said pixel-block area, depending on the size of the partial image to be recognized within said pixel-block area.

3. The pattern-detection apparatus of claim 1 having further a low-resolution conversion unit that converts the binary image data obtained by said binarizing unit to binary image data of lower resolution, wherein said partial-image recognition unit recognizes said partial image for the binary image data converted to lower-resolution image data by said low-resolution conversion unit.

4. A method for detecting a specific pattern contained in an image, said pattern-detection method comprising steps of:

binarizing input image data to obtain binary image data, recognizing a partial image that is contained in said binary image data, and that is part of said specific pattern and has an empty inside, by using a first partial-image test consisting of successively scanning, in said binary image data, a pixel-block area of predetermined size containing a target pixel, and determining if outermost lines of the pixel-block area are all OFF pixels and if a total number of ON pixels within the pixel-block area is within a prescribed range, performing a secondary partial-image test to test the pixel-block area to obtain additional data concerning the pixels therein for purposes of determining the specific pattern, and determining whether said specific pattern is contained in said binary image data, based on the recognition results obtained by the testing.

5. A computer-readable storage medium that stores a pattern-detection program for detecting a specific pattern contained in an image, said pattern-detection program comprising steps of:

binarizing input image data to obtain binary image data, recognizing a partial image that is contained in said binary image data, and that is part of said specific pattern and has an empty inside, by using a first partial-image test that consists of successively scanning, in said binary image data, a pixel-block area of predetermined size containing a target pixel, and determining if outermost lines of the pixel-block area are all OFF pixels and if a total number of ON pixels within the pixel-block area is within a prescribed range, performing a secondary partial-image test on the pixel-block area to obtain additional data concerning the pixels therein for purposes of determining the specific pattern, and determining whether said specific pattern is contained in said binary image data, based on the recognition results obtained by secondary testing.

6. The pattern detection apparatus of claim 1, wherein said secondary partial-image recognition unit tests the pixel-block area to determine pixel information at opposite vertices.

7. The pattern detection apparatus of claim 1, wherein said secondary partial-image recognition unit tests the pixel-block area to determine pixel information at outermost lines.

8. The pattern detection apparatus of claim 1, wherein said secondary partial-image recognition unit tests the pixel-block area to determine pixel information at a pair of opposite sides of outermost lines.

9. The method of claim 4, wherein the secondary partial-image test tests the pixel-block area to determine pixel information at opposite vertices.

10. The method of claim 4, wherein the secondary partial-image test tests the pixel-block area to determine pixel information at outermost lines.

11. The method of claim 4, wherein the secondary partial-image test tests the pixel-block area to determine pixel information at a pair of opposite sides of outermost lines.

12. The computer readable medium of claim 5, wherein the secondary partial-image test tests the pixel-block area to determine pixel information at opposite vertices.

13. The computer readable medium of claim 5, wherein the secondary partial-image test tests the pixel-block area to determine pixel information at outermost lines.

14. The computer readable medium of claim 5, wherein the secondary partial-image test tests the pixel-block area to determine pixel information at a pair of opposite sides of outermost lines.

* * * * *